Oct. 23, 1956  K. W. HALLDEN  2,767,829
APPARATUS FOR DRAWING ROD STOCK
Filed July 7, 1952  12 Sheets-Sheet 5
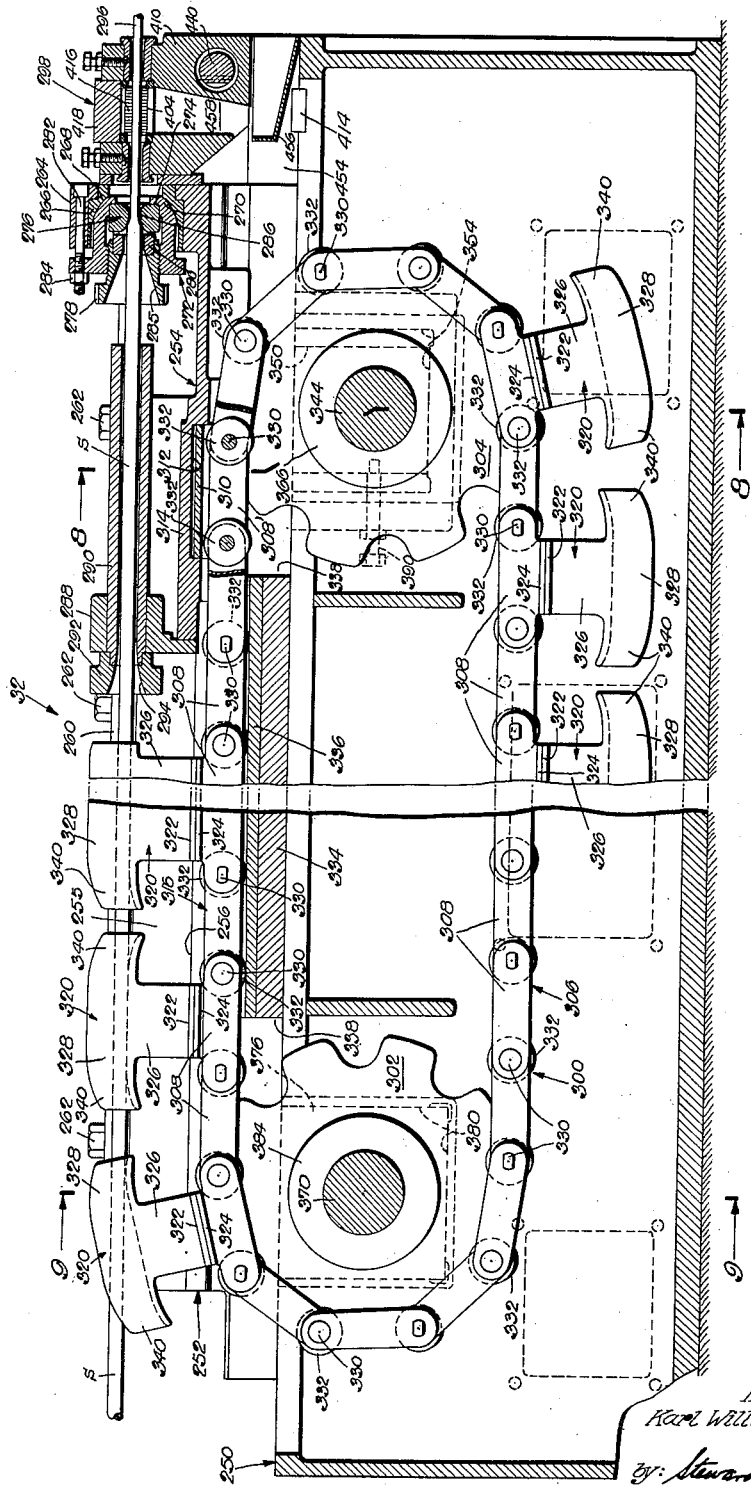
Inventor:
Karl William Hallden
by: Steward & Sprigel
Attorneys.

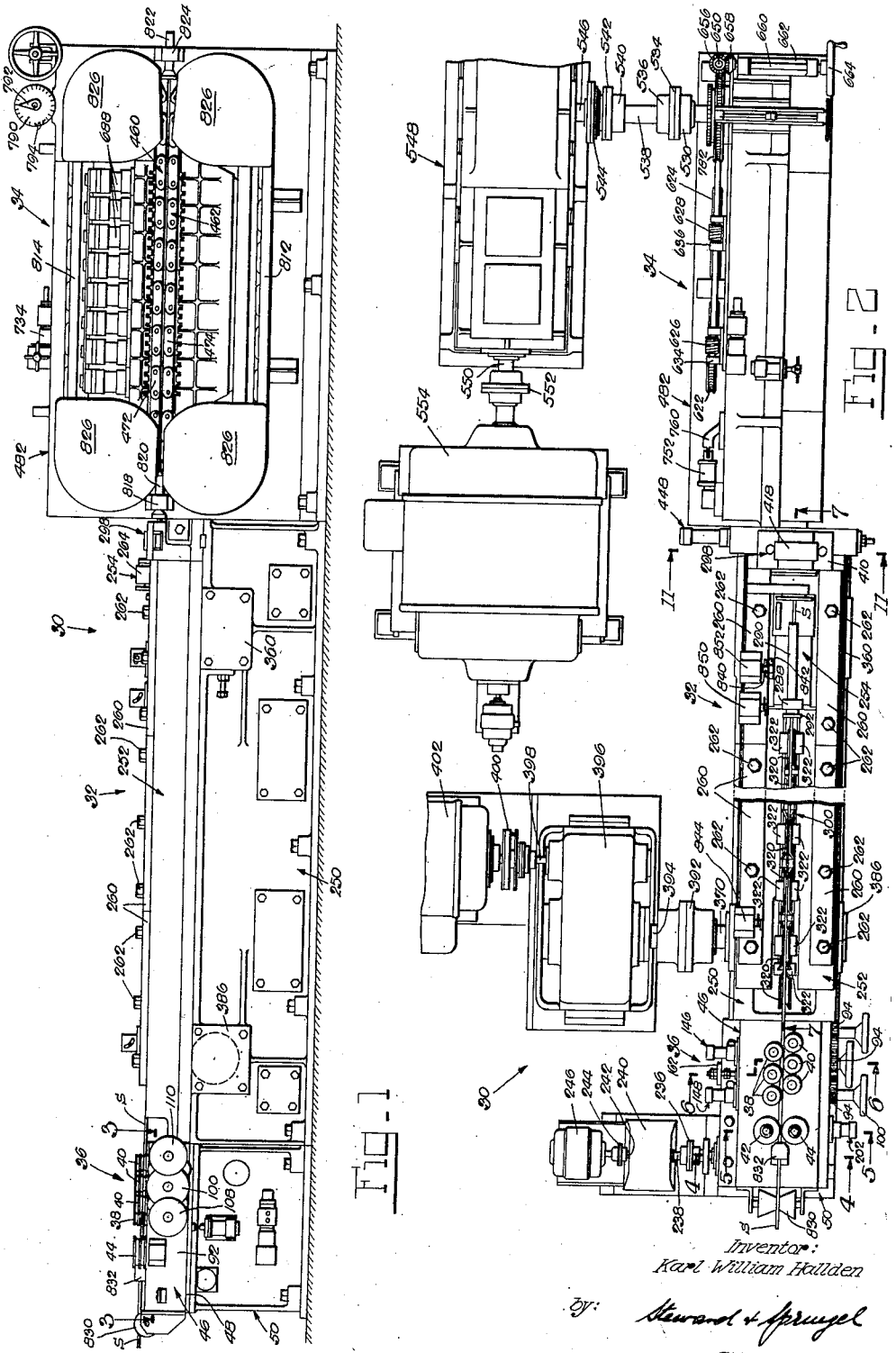

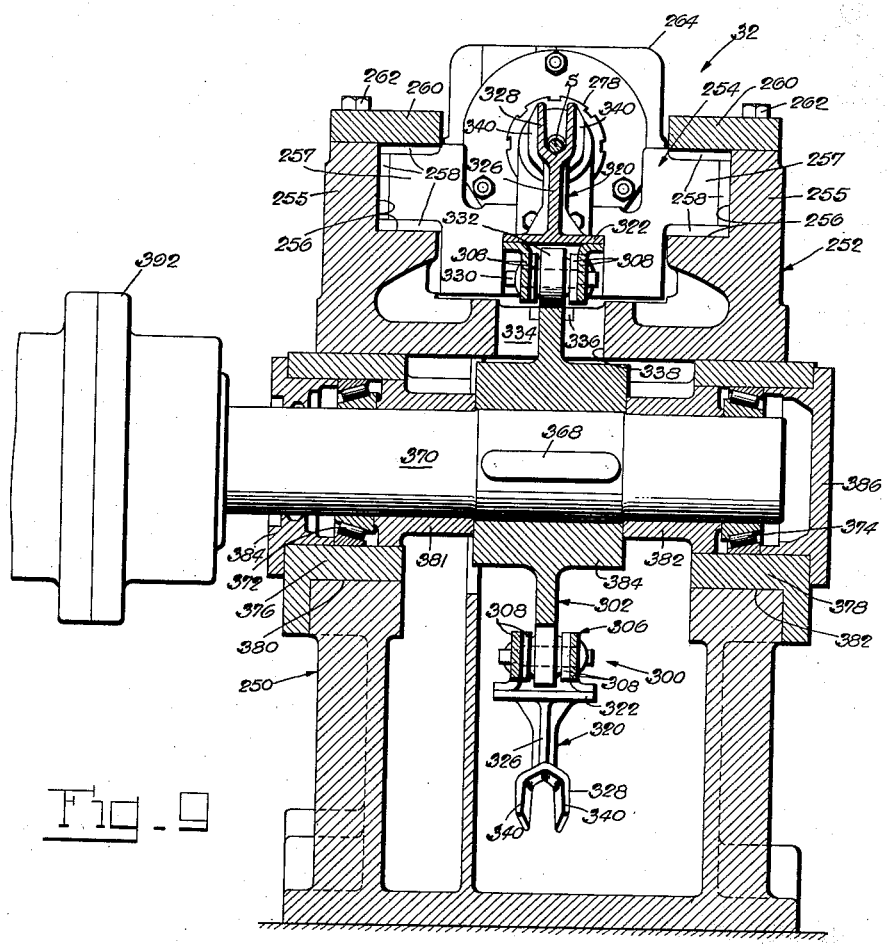
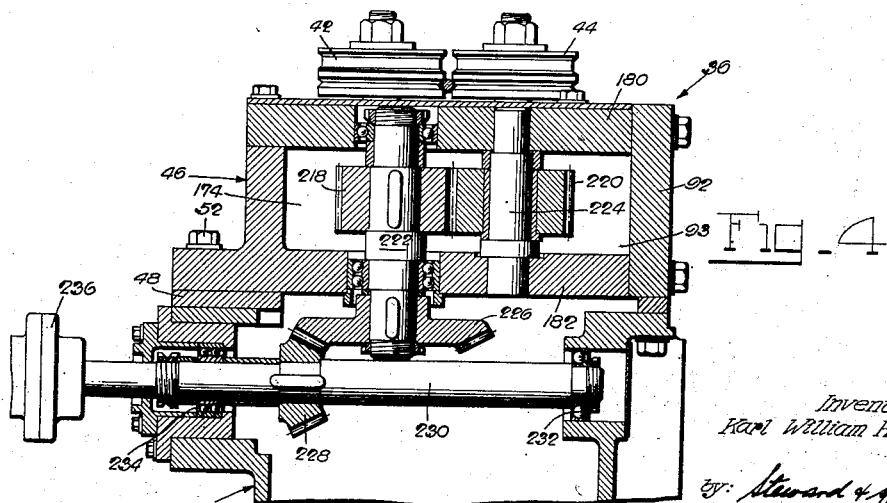

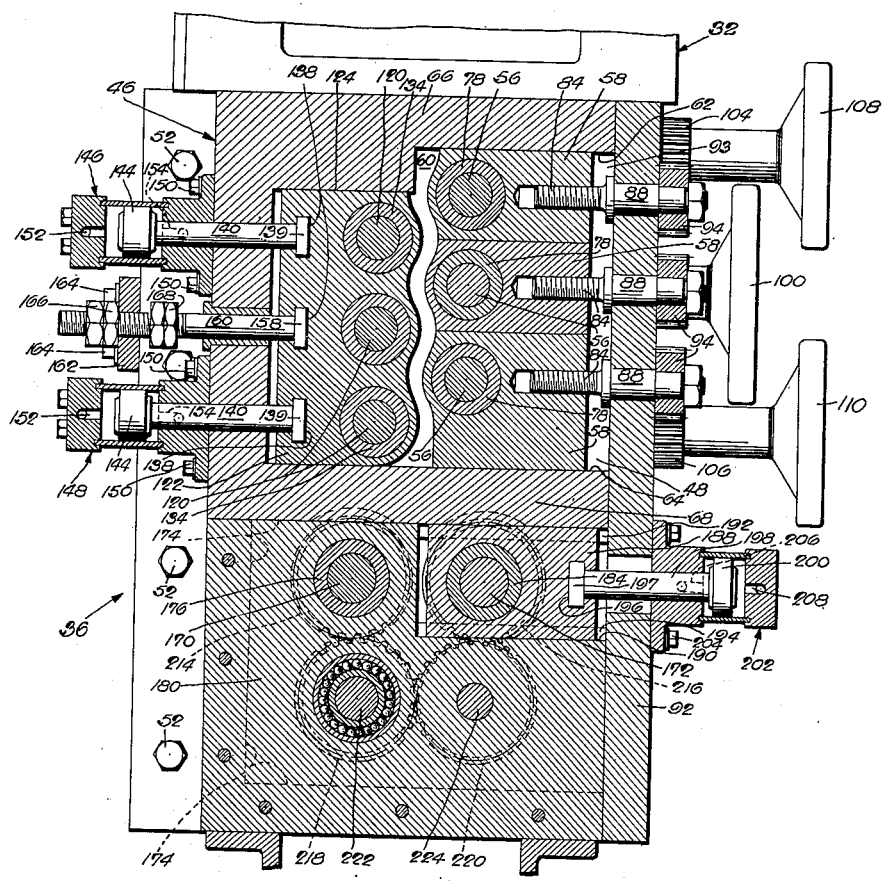

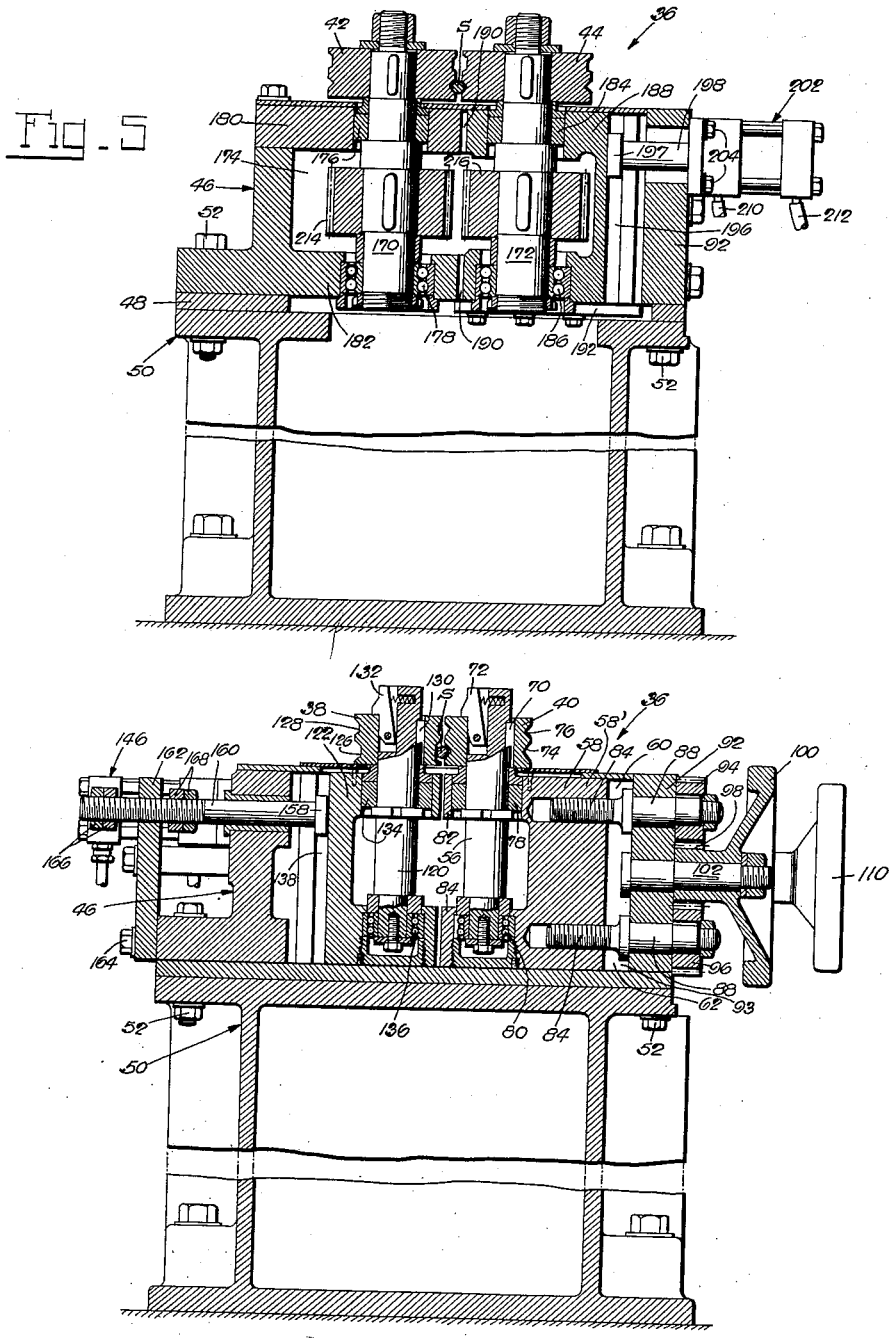

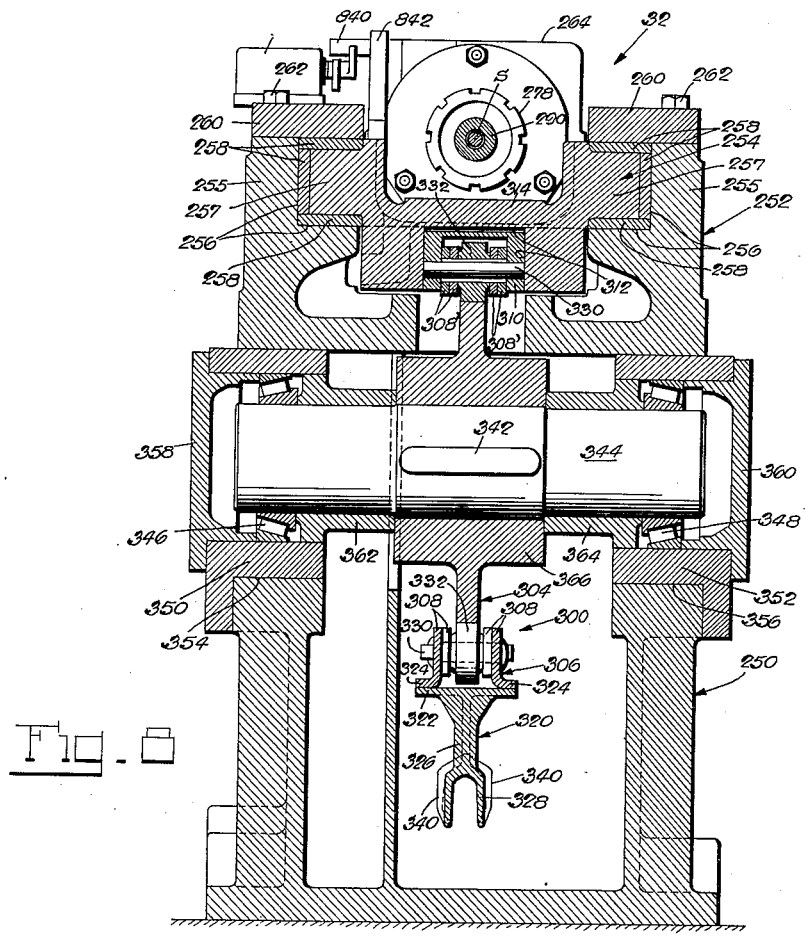

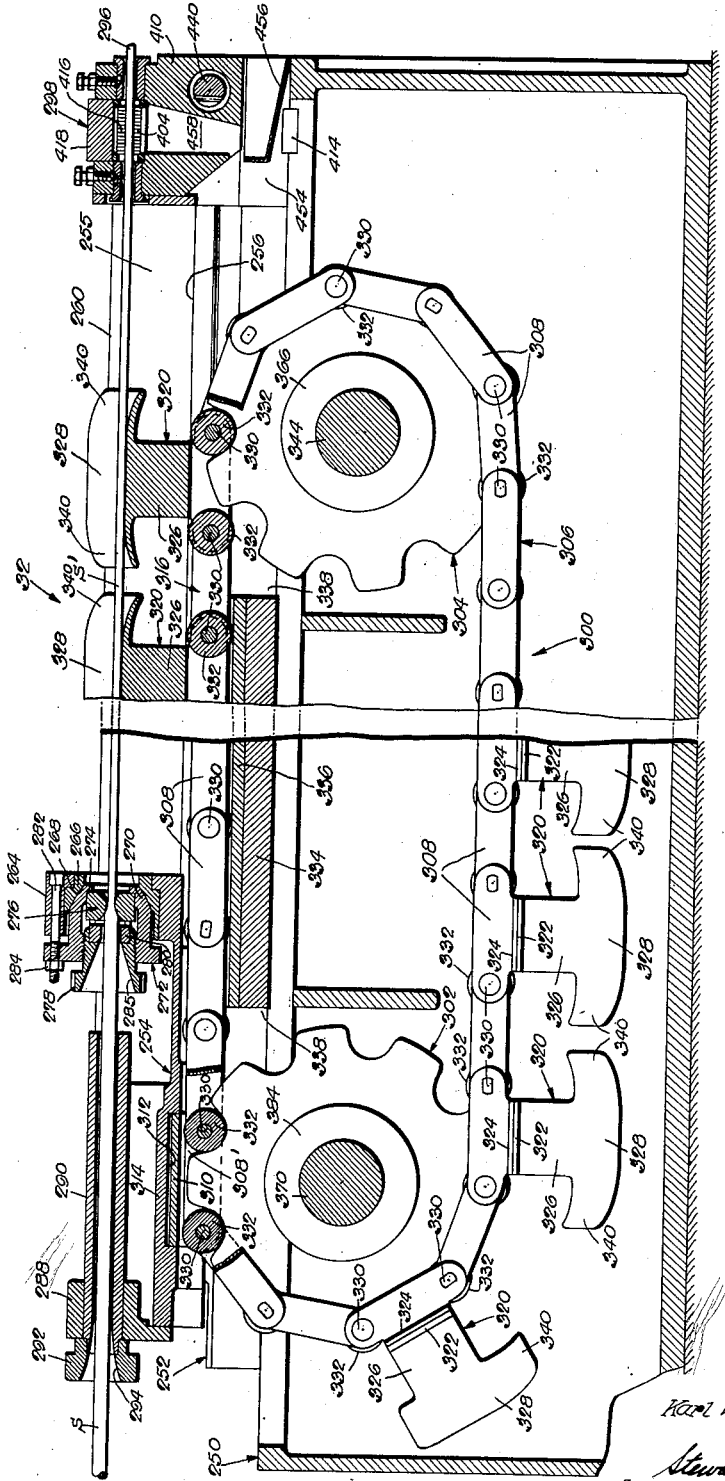

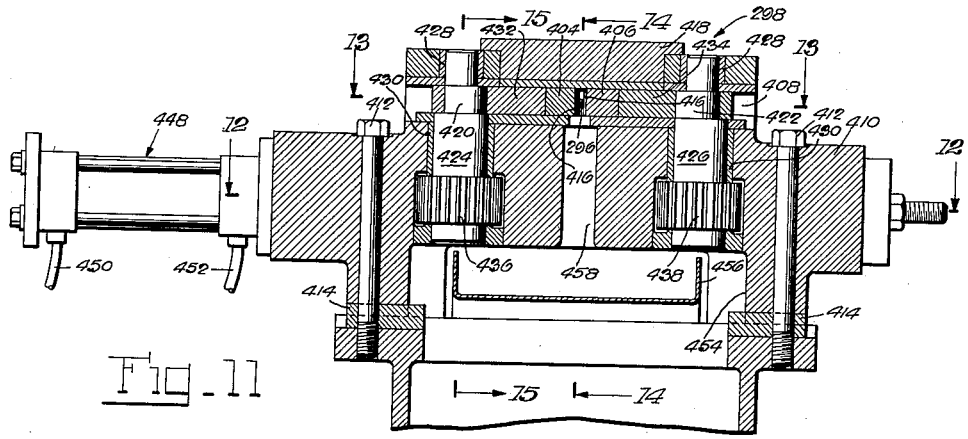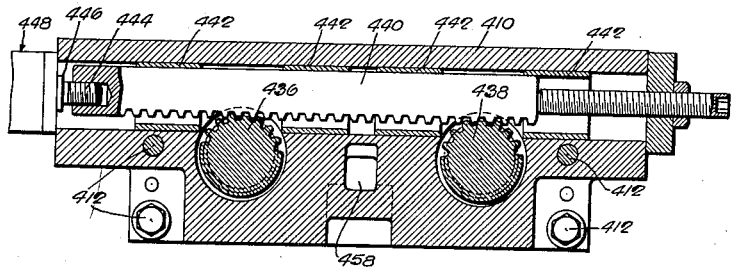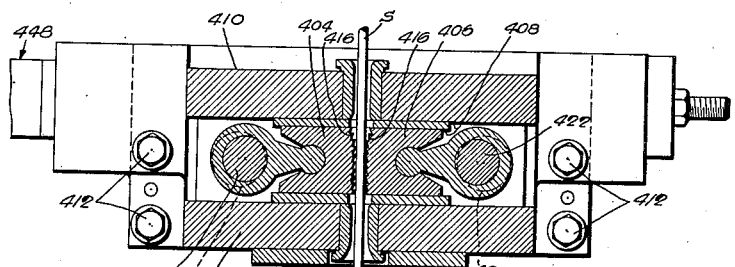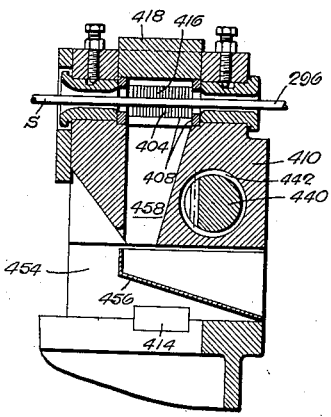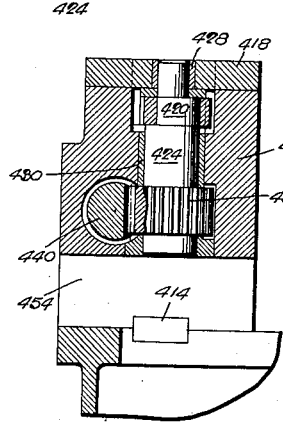

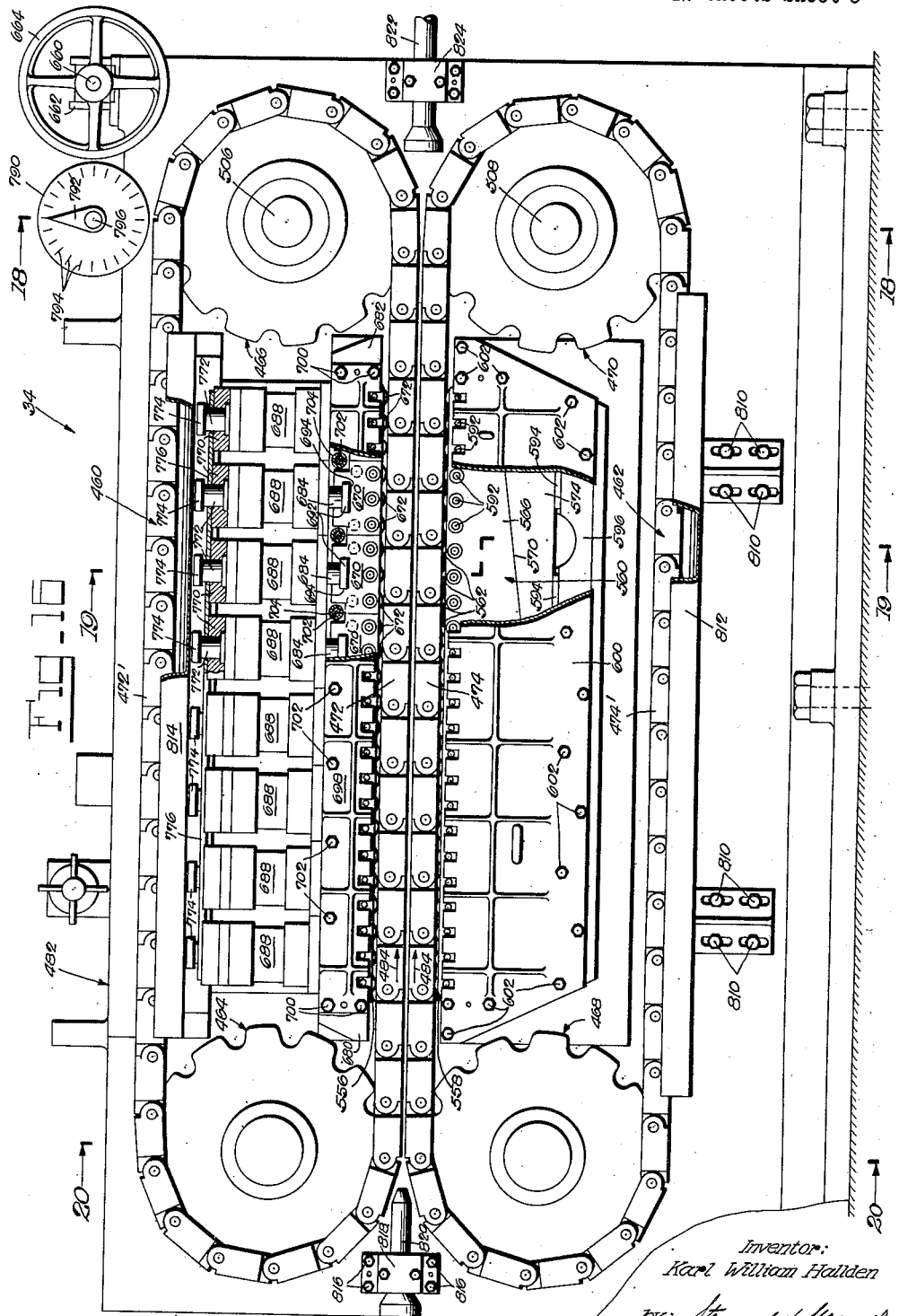

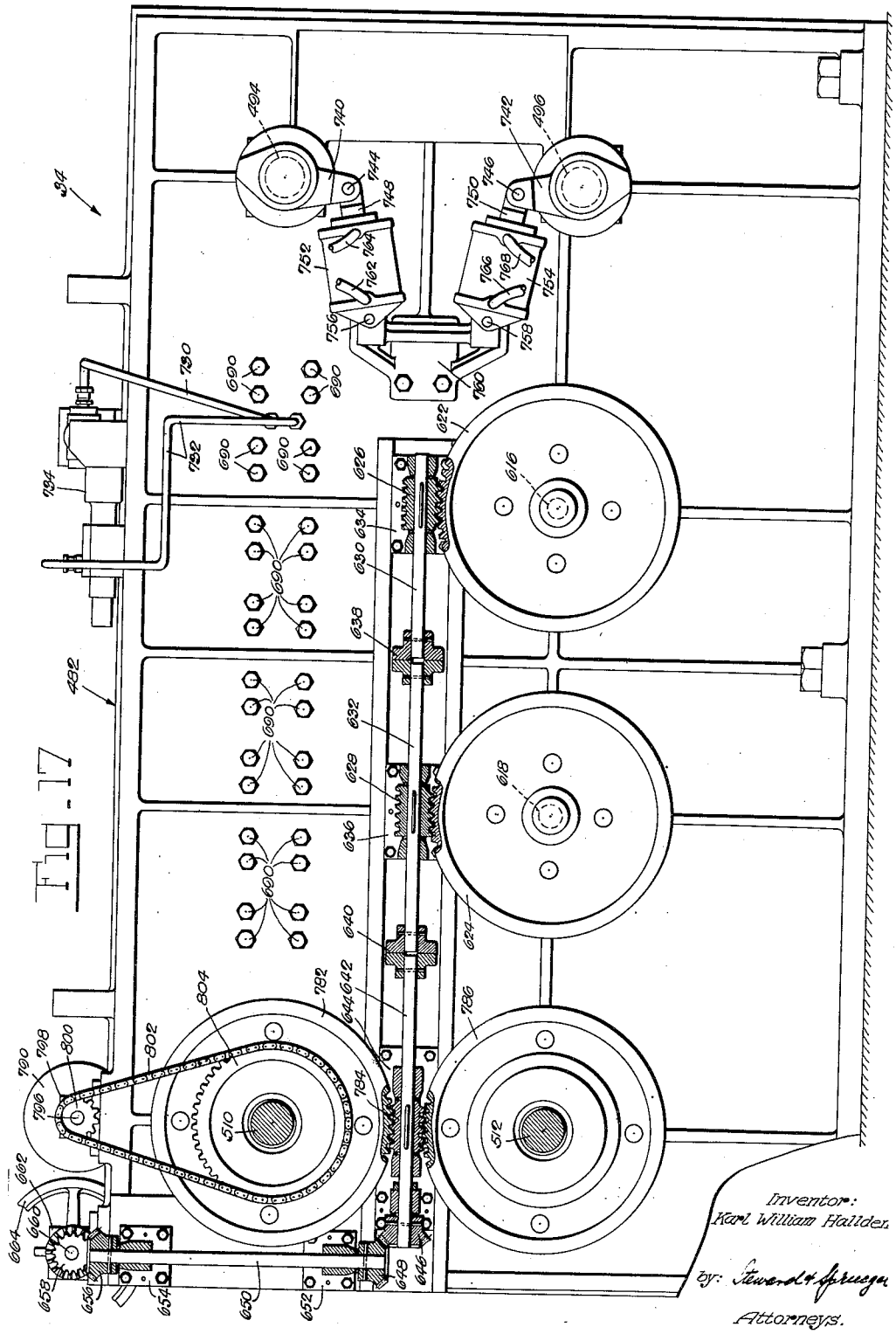

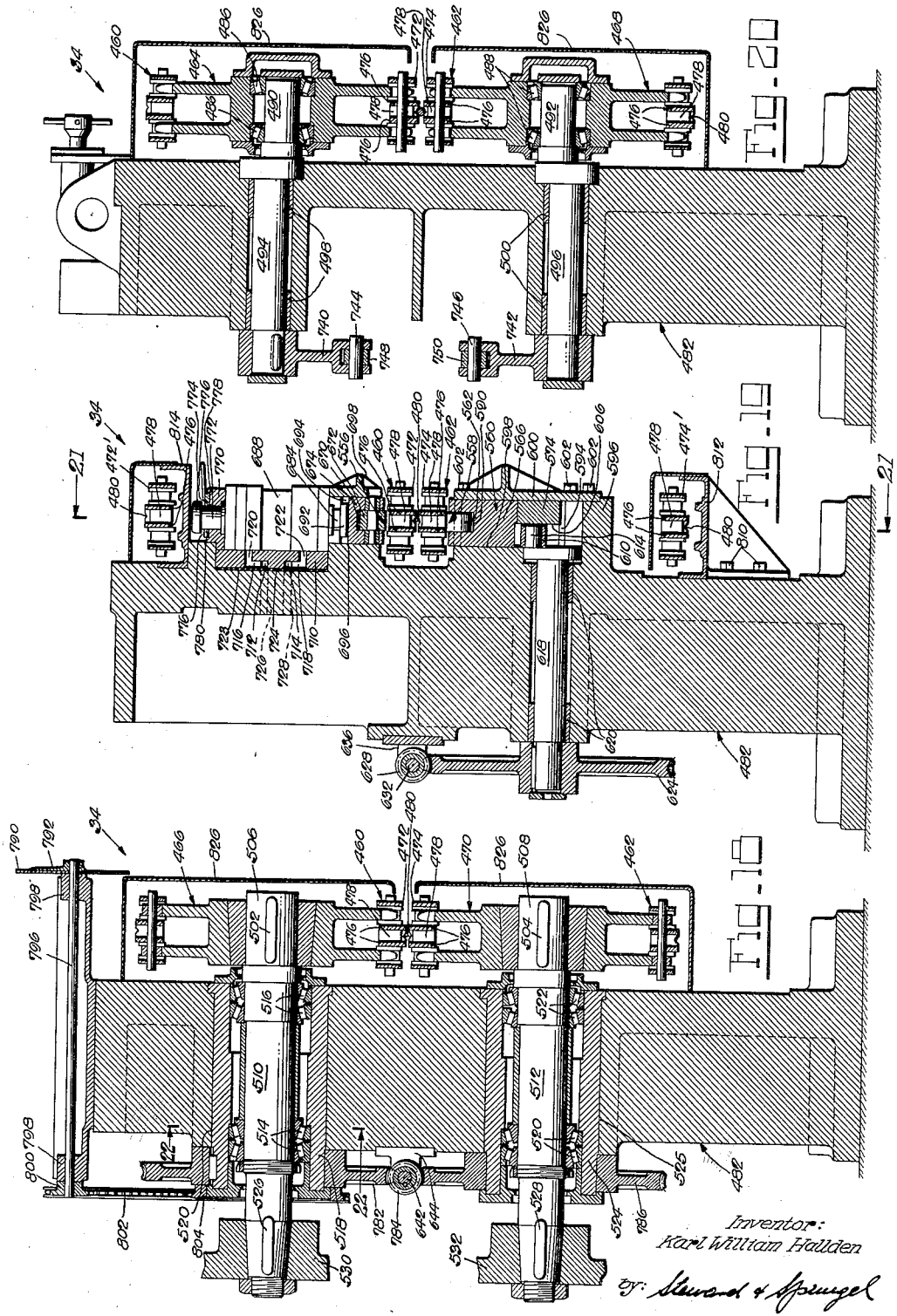

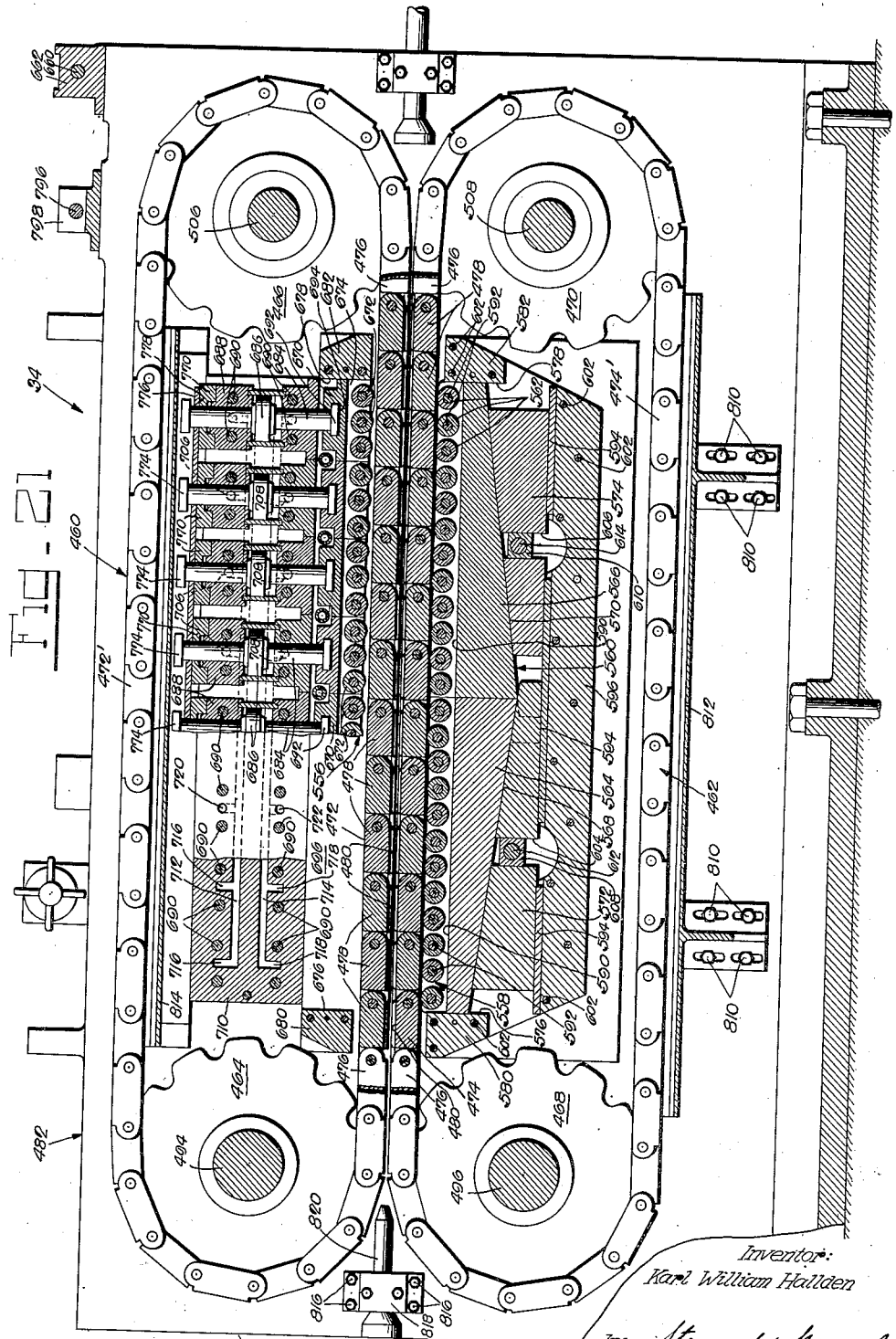

United States Patent Office 2,767,829
Patented Oct. 23, 1956

2,767,829

APPARATUS FOR DRAWING ROD STOCK

Karl William Hallden, Thomaston, Conn., assignor to The Hallden Machine Company, Thomaston, Conn., a corporation of Connecticut Application July 7, 1952, Serial No. 297,504

10 Claims. (Cl. 205—3)

This invention relates generally to the drawing of rod stock, and more particularly to apparatus of the continuous stock-drawing type and a method of drawing continuous rod stock.

In order to draw continuous rod stock through a die, previous apparatus of this type rely on reciprocating grippers which alternately draw or pull the stock much in the fashion of hand-over-hand hauling. To achieve uniformity of the size, texture and temper, of drawn rod stock, it is imperative that the stock be passed through the die at uniform speed, or at least substantially uniform speed. Due to the periodically alternating gripping and drawing action of the aforementioned grippers, they will meet the imperative requirement of substantially uniform passage of the stock through the die only when drawing the stock at a comparatively low rate of speed. Any attempt at increasing the stock-drawing speed of these grippers, especially to the high speed demanded by modern industry, is doomed to failure. This is due to the fact that any considerable increase in the operating speed of these grippers beyond their maximum permissible speed would, on each resumption of their alternate drawing action on the stock, result in uncontrollable slippage of the same on the stock, and accordingly in frequent variation in the speed of the stock. Furthermore, any considerable increase in the operating speed of these grippers beyond their maximum permissible speed would result in periodic engagement of the same with the stock with a prohibitive impact force which would mar the drawn stock and also lead to rapid wear of the grippers. Moreover, stock-drawing apparatus of this type used heretofore are, by virtue of their low operating speed, incapable of efficient combined performance with modern high-speed stock-cutting shears of the flying type to eliminate any handling of continuous rod stock between the drawing of the stock and its cutting into desired lengths.

It is the primary aim and object of the present invention to provide apparatus of the continuous stock-drawing type that will perform efficiently and reliably at an operating speed which is several times greater than the maximum permissible operating speed of previous stock-drawing apparatus of this type, and easily satisfies even the most exacting production demands of modern industry.

Thus, it is an important object of the present invention to provide, for the passage of continuous rod stock through a die, a tractor feed which is not only capable of pulling the stock through the die at a much higher and more uniform speed than the previous grippers, but has also such a low specific pressure on the stock that marring of the same is unlikely even at exceptionally high operating speed of the tractor feed.

It is another important object of the present invention to require no more than the customary preliminary pointing of a short end length of a new supply of continuous rod stock for introducing the latter into the present apparatus, and to have provisions incorporated in the apparatus for performing on the introduced rod stock all additional preliminary operations required for the uniform draw of the stock through the die by the aforementioned tractor feed, so that the task of introducing new rod stock in the instant apparatus with its tractor feed is as facile as the introduction of new rod stock in previous apparatus of this type.

It is a further important object of the present invention to have the aforementioned tractor feed accurately set, and adapted solely, for gripping rod stock of the desired drawn size and pulling the stock through the die with a force that the stock will neither be marred by, nor slip in, the tractor feed even at exceptionally high operating speed of the latter, and to have provisions in apparatus of this type for pre-drawing to the correct size a considerable leading length of a new supply of continuous rod stock so that this pre-drawn stock length may subsequently be gripped securely and uniformly by the tractor feed for starting the uniform draw of the entire stock through the die on the following normal stock-drawing performance of the apparatus.

Another object of the present invention is to pre-draw a leading length of a new supply of continuous rod stock in the same die of the apparatus in which the remainder of the stock will subsequently be drawn to the desired reduced size, so that only a single die is required for all drawing operations, and the entire rod stock, including its leading pre-drawn length, will be reduced to the same exact size even if the die should be slightly worn, with the result that there is practically no waste of stock and the entire stock will be gripped most uniformly by the tractor feed for its uniform draw through the die.

A further object of the present invention is to devise a method of pre-drawing the aforementioned leading length of a new supply of continuous rod stock in the die of the apparatus, according to which a relatively short prepointed end of the stock is passed through the die and temporarily gripped and held immediately behind the die in its normal operating position, and the die is then retracted over the stock thus held through a distance commensurate with the leading stock length to-be-predrawn.

It is another object of the present invention to rely on the considerable static friction between the die and pre-drawn rod stock in feeding the latter into the tractor feed for the following normal stock-drawing performance of the apparatus, by simply advancing the die from its retracted position into its normal operating position as an additional step in the aforementioned method, thus entailing a minimum of handling of the rather unwieldy rod stock in the task of introducing a new supply of stock in the apparatus.

It is a further object of the present invention to provide apparatus of this type with simple equipment which lends itself not only to drawing rod stock in accordance with the aforementioned method, but also to pre-drawing a leading length of a new supply of continuous rod stock in timed relation with the subsequent normal drawing performance of the apparatus on the remainder of the stock, so that the time required for the overall drawing operation on the entire stock may be only insignificantly longer than if the entire stock were drawn through the die at the high speed of the tractor feed.

Another object of the present invention is to have among the aforementioned drawing equipment of the instant apparatus a stock pre-draw unit which comprises a simple slide that carries the die and is movable longitudinally of the rod stock in the apparatus, and simple preliminary grippers which will securely hold the pointed end of new rod stock during a pre-drawing operation on the latter, and will quickly release the stock for its advance into the tractor feed by the die in accordance with the aforementioned method.

It is a further object of the present invention to provide in apparatus of this type an endless chain drive for moving the aforementioned slide in opposite directions for the stock pre-drawing and stock-feeding performances of the die in accordance with the aforementioned method, and to provide the links of the chain on both sides of the slide with complementary guide elements which during movement of the slide in either direction combine to form over the entire path of the slide a substantially continuous stock guide which effectively counteracts any tendencies of the rod stock to bend or buckle, thus preventing undue wear or even damage to the die, or jamming of the apparatus.

It is another object of the present invention to have the aforementioned preliminary grippers and the tractor feed in apparatus of this type self-compensating so that rod stock will securely be gripped thereby for pre-drawing and normal drawing purposes even if the die aperture should through wear have become enlarged.

Another object of the present invention is to provide in apparatus of this type a die holder which will receive dies of different apertures, and to provide for adjustment of the tractor feed so that rod stock drawn to different sizes in different dies will be gripped evenly by the tractor feed and subjected thereby to equal tensile stresses throughout and no other stresses, with the result that drawn rod stock of any size will emerge straight, or substantially straight, from the tractor feed, and the instant apparatus readily lends itself to the drawing of rod stock of different sizes simply by interchanging dies in the holder therefor and adjusting the tractor feed.

It is a further object of the present invention to provide the aforementioned tractor feed with two endless conveyor chains which pass over sprockets, and have adjacent rod-gripping or operating runs of which one run rides on a non-yielding track that is adjustable toward and away from the other run, and the latter is yieldingly urged toward its companion run and accordingly self-compensating, so that rod stock of any drawn size between these operating runs of the chains may readily be held thereby in exact axial alignment with the aperture of the die in which the stock is drawn to size.

Another object of the present invention is to provide for the aforementioned self-compensating chain run a yielding track on which the same rides when both operating runs of the chain draw rod stock, so that this self-compensating chain run will have as uniform a grip on the stock as the adjacent companion chain run.

A further object of the present invention is to make arrangements for the power drive of those sprockets of the chains which are at the exit end of the tractor feed, so that the operating runs of the chains will have maximum traction on the rod stock for assuredly overcoming the high resistance encountered by the stock in the die of the apparatus; and to provide for adjustment of these power-driven sprockets toward and away from each other so that they may, on any adjustment of the non-yielding chain track for any given drawn size of rod stock, draw the operating chain runs in rectilinear paths over and beyond their respective tracks, with the result that the pull of these sprockets on the operating chain runs will not compel the latter into pressing engagement with their tracks and will not cause them to bend abruptly at the run-off ends of the latter.

It is another object of the present invention to provide each of the aforementioned chain tracks with a multiplicity of anti-friction rollers on which the respective operating runs of the chains ride, thereby to reduce to a minimum the friction between these tracks and chain runs when the latter draw rod stock and, accordingly, save the operating parts of the tractor feed from undue wear and keep the power requirements of the latter at a minimum.

Another object of the present invention is to have the yielding chain track formed by a battery of side-by-side arranged track sections each of which carries a few rollers and is independently yieldable, so that the rod stock will be gripped most evenly substantially by all the rollers on both chain tracks.

A further object of the present invention is to provide for each of the aforementioned sections of the yielding chain track a pneumatic cylinder and a piston therein which is connected with the track section for normally yieldingly forcing the rollers thereon into firm gripping engagement with the stock in the tractor feed.

It is another object of the present invention to have each of the aforementioned pistons double-acting to permit also relief of the corresponding chain of the tractor feed of any strain from the yielding chain track when no stock passes through the tractor feed.

Another object of the present invention is to arrange the cylinders for the sections of the yielding chain track wholly between the opposite runs of the associated tractor chain, and so that the axes of the pistons intersect the rod stock passing through the tractor feed in order that the full force of the pistons may directly be applied to the fed rod stock without setting up harmful bending stresses either in the pistons or in the track sections.

A further object of the present invention is to provide a control over the stock-gripping strokes of the pistons in the aforementioned cylinders, so that these pistons will, at the end of their stock-gripping strokes, be stopped while the operating runs of the chains are still sufficiently separated to grip and draw rod stock which is being introduced into the tractor feed while running.

It is another object of the present invention to provide for variation in the aforementioned control over the stock-gripping stokes of the pistons in the cylinders, so that stock of different drawn sizes may be introduced into the running tractor feed and be gripped and drawn thereby.

It is a further object of the present invention to facilitate the task of adjusting the tractor feed to rod stock of different drawn sizes, by having on the tractor feed provisions for simultaneously adjusting the aforementioned power-driven sprockets and the non-yielding chain track on manipulation of a single actuator.

Another object of the present invention is to expedite the accurate adjustment of the tractor feed to rod stock of different drawn sizes, by providing an indicator or pointer which is operatively connected with the aforementioned actuator so as to move over a scale or dial, which is graduated in different drawn rod sizes, and indicate thereon the adjustment of the tractor feed at any given moment as a guide to an operator undertaking an adjustment of the tractor feed to a given drawn stock size.

Other objects and advantages will appear to those skilled in the art from the following, considered in conjunction with the accompanying drawings.

In the accompanying drawings, in which certain modes of carrying out the present invention are shown for illustrative purposes:

Fig. 1 is an elevational view of apparatus embodying the present invention;

Fig. 2 is a top plan view of the same apparatus;

Fig. 3 is an enlarged horizontal section through a pre-straightener unit of the instant apparatus, the section being taken on the line 3—3 of Fig. 1;

Figs. 4, 5 and 6 are enlarged sections through the same pre-straightener unit of the apparatus, the sections being taken on the lines 4—4, 5—5 and 6—6, respectively, of Fig. 2;

Fig. 7 is an enlarged longitudinal section through a drawing unit of the apparatus, the section being taken on the line 7—7 of Fig. 2;

Figs. 8 and 9 are cross-sections through the drawing unit of the apparatus, the sections being taken on the lines 8—8 and 9—9, respectively, of Fig. 7;

Fig. 10 is a section similar to Fig. 7, showing certain operating parts of the drawing unit of the apparatus in different operating positions, however;

Fig. 11 is an enlarged section through an operating device of the drawing unit of the apparatus, the section being taken on the line 11—11 of Fig. 2;

Figs. 12 to 15, inclusive, are sections through the same operating device of the drawing unit of the apparatus, the sections being taken on the lines 12—12, 13—13, 14—14 and 15—15, respectively, of Fig. 11;

Fig. 16 is a front-elevational view, partly in section and partly broken away, of a tractor feed of the apparatus;

Fig. 17 is a rear-elevational view, partly in section, of the same tractor feed of the apparatus;

Figs. 18, 19 and 20 are cross-sections through the tractor feed of the apparatus, the sections being taken on the lines 18—18, 19—19 and 20—20, respectively, of Fig. 16;

Fig. 21 is a section through the tractor feed of the apparatus, the section being taken substantially on the line 21—21 of Fig. 19;

Fig. 22 is a fragmentary section taken on the line 22—22 of Fig. 19; and

Fig. 23 shows a certain detail element of the tractor feed of the apparatus.

Referring to the drawings, and more particularly to Figs. 1 and 2 thereof, the reference numeral 30 designates apparatus for drawing continuous rod stock, comprising a stock-drawing unit 32 and a tractor feed unit 34, as well as a stock pre-straightening unit 36. One account of the considerable size of each of these units, they are preferably built as separate devices and subsequently coordinated in a single machine aggregate as shown in Figs. 1 and 2. The pre-straightening unit 36, while not forming any part of the present invention, is nevertheless shown and described herein in order to demonstrate the ready application of the instant drawing unit 32 and tractor feed 34 with the usual pre-straightening equipment for preparing rod stock in its original extrusion stage for a cold-drawing operation in order to harden and temper the stock and also give it a smooth surface. Thus, extruded rod stock has a more or less rough surface, and extends irregular and snake-like due to widely differing compressive and tensile stresses set up at random in the stock in the course of its extrusion. The unwieldy bends in the extruded rod stock will prevail even when the latter is rolled into a coil or hank for storage, shipment and further fabrication into smooth straight rods. In order to straighten the extruded rod stock at least to such an extent that the same may expeditiously be drawn through a reducing die without causing undue wear of or damage to the die or becoming jammed therein, the extruded rod stock is usually subjected to a pre-straightening operation, such as is performed by the instant pre-straightening unit 36.

As the rod stock leaves the pre-straightening unit 36, it passes into the instant drawing unit 32 in which the stock is drawn through a reducing die by the tractor feed 34 in the normal stock-drawing performance of the apparatus. As described more fully hereinafter, the tractor feed 34 is advantageously set up accurately for uniform high-speed draw of the rod stock through the die without exerting on the stock anywhere near a specific gripping pressure that would mar the stock, so that the tractor feed is not only unsuited but also unintended for firmly gripping a leading pre-pointed length of a new supply or rod stock for its start through the apparatus. Moreover, the task of pre-pointing an end of a large supply of unwieldy rod stock to the considerable longitudinal extent required for its secure grip by a relatively long tractor feed would not only be cumbersome and time-consuming, but wasteful of rod stock as well. Accordingly, and in order that no preliminary operation on a large supply of continuous rod stock, other than the pre-pointing of a short leading length thereof, is required for introducing the stock in the apparatus, the instant drawing unit 32 is adapted not only for the normal draw of the stock through the die by the tractor feed, but also for pre-drawing in the same die a considerable leading length of the stock and feeding the pre-drawn stock length into operative relation with the running tractor feed for starting the normal draw of the entire stock through the die by the tractor feed, all as more fully described hereinafter.

The instant drawing unit 32 and the tractor feed 34, as well as the pre-straightening unit 36, are also adjustable to perform on stock of different sizes. In this connection, the drawing unit 32 has a die holder for the removable mounting of interchangeable dies of different size apertures, and the tractor feed 34 as well as the pre-straightening unit 36 may be readily adjusted to a given size rod stock by a few simple manipulations of an operator.

The various operating units of the instant apparatus will now be described in detail in the order in which they perform on rod stock.

*Pre-straightening unit 36*

Referring now to Figs. 1 to 6, the pre-straightening unit 36 comprises two companion sets of straightener rolls 38 and 40, respectively, and a pair of feed rolls 42 and 44 which are adapted to advance rod stock s of a supply to-be-drawn between and beyond the straightener rolls 38 and 40. The straightener rolls 38, 40 and feed rolls 42, 44 have bearing provisions in a frame 46 which is supported on a platform 48 on top of any suitable base 50. The frame 46 and platform 48 may conveniently be bolted to the base 50 as at 52. Each set of straightener rolls 38 and 40 comprises in this instance three rolls, and the rolls of both sets are arranged in the staggered fashion shown in Fig. 2, so that the path of the rod stock between these rolls is sinuous-like for the repeated bending of the stock to reduce its major compressive and tensile stresses to an extent where the rod stock will emerge from the unit 36 sufficiently straight to permit its subsequent drawing operation in the die of the apparatus without causing undue wear of or damage to the die, or becoming jammed therein. In the present instance, the straightener rolls 40 are adjustable toward and away from their companion rolls 38, and the latter are yieldingly advanceable to any desired extent toward the rolls 40, so that the rolls 38 and 40 lend themselves to pre-straightening rod stock of different sizes, as well as compelling fed rod stock of any size through any desired sinuous path best suited for straightening the stock for subsequent drawing purposes.

Each of the straightener rolls 40 is carried by a shaft 56 in a sliding carrier 58 in the frame 46 (Figs. 3 and 6). The carriers 58, which are slidably supported on the platform 48 within a compartment 60 in the frame 46, are in side-by-side engagement with each other (Fig. 3) and are guided for individual rectilinear movement, to and from the rolls 38 (Fig. 6), between the machined surfaces 62 and 64 of an end wall 66 and a partition wall 68 of the frame 46. Each of the straightener rolls 40 is keyed at 70 to its respective shaft 56 (Fig. 6), and is held against axial removal therefrom by a spring-urged latch 72. The straightener rolls 40 are in this instance identical, each being provided with two alternative peripheral grooves 74 and 76 with which to engage rod stock of considerably different sizes. The roll-carrying shafts 56 are journalled in suitable bearings 78 and 80 in spaced legs 82 and 84 of the respective carriers 58, there being further suitable provisions for preventing axial movement of the shafts 56 in their respective journal bearings 78 and 80.

Each of the carriers 58 receives, for its individual adjustment, the threaded shanks 84 of a pair of spaced rotary spindles 88 which are axially immovably mounted in a cover plate 92 on the open side 93 of the frame 46. The spindles 88 of each pair carry on the outside of the cover plate 92 gears 94 and 96, respectively (Figs. 3 and 6). The gears 94 and 96 on the spindles 88 for the intermediate carrier 58′ are in direct mesh with a gear 98 on the hub of a hand wheel 100 which is freely rotatable on a fixed stub shaft 102 on the cover plate 92 (Fig. 6). The gear pairs 94 and 96 on the spindles 88 for the other carriers 58 are drivingly connected through idler gears (not shown) with gears 104 and 106, respectively, on the hubs of additional handwheels 108 and 110 which are freely rotatable on fixed shafts on the cover plate 92. Thus, on manipulation of either one of the handwheels 100, 108 or 110, the respective carriers 58 may be adjusted to bring their straightener rolls 40 closer to or further away from the adjacent rolls 38.

In contrast to the individual adjustability of the straightener rolls 40 to and from their companion rolls 38, the latter are advanced toward or retracted from the rolls 40 in unison. To this end, the rolls 38 are carried by shafts 120, respectively, which have their journal bearings provided in a single sliding carrier 122 (Fig. 3). The carrier 122, which is also received in the frame compartment 60 and slidably supported on the platform 48, is guided for rectilinear movement toward and away from the carriers 58 between the machined side surfaces 124 and 64 of the end wall 66 and partition wall 68, respectively, of the frame 46. The straightener rolls 38 are identical, and are in this instance also identical with their companion rolls 40, except that their alternate peripheral grooves 126 and 128 are of cross-sectional shapes which are preferably different from those of the corresponding grooves 74 and 76 in the rolls 40 in order readily to adapt the rolls 38 and 40 for pre-straightening stock of different cross-sectional shapes. The rolls 38 are keyed at 130 to their respective shafts 120 and held against axial removal therefrom by spring-urged latches 132 which are like or similar to the latches 72 for the other rolls 40. Of course, the spring-urged latches 72 and 132 permit ready removal of the rolls 38 and 40 from their respective shafts 120 and 56 and substitution of other rolls therefor. The shafts 120, which carry the rolls 38, have suitable journal bearings 134 and 136 in the carrier 122.

As best shown in Figs. 3 and 6, the carrier 122 is provided with a plurality, in this instance three, T slots 138 of which the endmost slots fittingly receive the heads 139 of rods 140 which connect the carrier 122 with pistons 144 in cylinders 146 and 148, respectively. The cylinders 146 and 148 may conveniently be bolted at 150 to the outside of the frame 46. The pistons 144, which in this instance are operated by compressed air, are of the double-acting type as evidenced by the provision in each of the cylinders 146 and 148 or air ducts 152 and 154 that lead to the opposite ends of the cylinder. Thus, on admitting compressed air through the ducts 152 into the adjacent ends of the cylinders 146 and 148 and simultaneously venting the other ends of these cylinders through the ducts 154, the pistons 144 will be forced in a direction to bring the rolls 38 on the carrier 122 into operative relation with their companion rolls 40 for pre-straightening rod stock therebetween. Conversely, on admitting compressed air through the ducts 154 into the adjacent ends of the cylinders 146 and 148 and simultaneously venting the other ends of these cylinders through the ducts 152, the pistons 144 will be moved in the opposite direction to retract the rolls 38 from cooperative relation with their companion rolls 40. The ducts 152 and 154 in the cylinders 146 and 148 may through suitable conduits be connected with a suitable valve (not shown) for controlling the simultaneous operation of the pistons 144 in both cylinders.

The intermediate T slot 138 in the carrier 122 fittingly received the head 158 of a spindle 160 which extends through a stop plate 162, mounted at 164 on the frame 46 (Figs. 3 and 6). The spindle 160 receives on opposite sides of the stop plate 162 adjustable nuts 166 and 168, respectively, for restricting the stroke of the carrier 122 in either direction, as desired.

As shown in Fig. 5, the stock feed rolls 42 and 44 are carried by shafts 170 and 172, respectively, which have suitable journal bearings in another compartment 174 of the frame 46 (Fig. 3). In the present instance, the feed roll 44 is advanceable toward and retractible from its companion roll 42, while the latter is fixed. The shaft 170, which carries the fixed feed roll 42, is journaled in suitable bearings 176 and 178 in a cover plate 180 on top of the frame compartment 174 and in a bottom wall 182 of the latter, respectively. The shaft 172, which carries the other feed roll 44, is journalled in suitable bearings 184 and 186 in a carrier 188 (Fig. 5) which is guided for rectilinear movement toward and away from the feed roll 42 in identical apertures 190 in the bottom wall 182 of the frame compartment 174 and in the top cover 180 on the latter (see also Fig. 3). The carrier 188 is slidably supported on suitable gibs 192 and 194 which may conveniently be machined in the bottom wall 182 of the frame compartment 174. The carrier 188 is provided with a T slot 196 in which is fittingly received the head 197 of a rod 198 that connects the carrier 188 with a piston 200 in a cylinder 202 which is conveniently bolted at 204 to the side cover plate 92. The piston 200, which in this instance is operated by compressed air, is double-acting as evidenced by the provision in the cylinder 202 of air ducts 206 and 208 that lead to the opposite ends of the cylinder. The ducts 206 and 208 in the cylinder 202 may through conduits 210 and 212 (Fig. 5) be connected with a suitable valve (not shown) with which to control the operation of the piston 200 in forcing the feed roll 44 into or from gripping engagement with rod stock between both feed rolls.

For driving the feed rolls 42 and 44, their respective shafts 170 and 172 carry gears 214 and 216 which are in permanent mesh with gears 218 and 220 on shafts 222 and 224, respectively (Figs. 3 and 4). The gears 218 and 220 are also in permanent mesh with each other, and their respective shafts 222 and 224 are suitably journalled in the bottom wall 182 of the frame compartment 174 and the top cover 180 thereon. The shaft 222 carries a bevel gear 226 which is in permanent mesh with another bevel gear 228 on a transverse shaft 230 that is suitably journalled at 232 and 234 in the base 50, and is coupled at 236 to the output shaft 238 of a gear reduction 240, the input shaft 242 of which is coupled at 244 to any suitable prime mover, such as an electric motor 246 (Fig. 2). Thus, the motor 246, when running, will through intermediation of the aforementioned gears 214 to 228 drive the feed rolls 42 and 44 in proper directions to feed rod stock to the straightener rolls 38 and 40.

*Drawing unit 32*

Referring now more particularly to Figs. 7 to 10, inclusive, the drawing unit 32 comprises a base frame 250 which is open at the top and has mounted thereon in any suitable manner a guide frame 252 for a slide 254. The guide frame 252 is generally channel-shaped in cross-section (Figs. 8 and 9), and is provided in its spaced side walls 255 with a machined longitudinal guideway 256 for the slide 254. The slide 254, which is generally U-shaped in cross-section (Fig. 8), has opposite machined formations 257 which are preferably provided with wear-resistant liners 258 for their sliding support in the guideway 256. The slide 254 is retained in the guideway 256 by gibs 260 which are mounted at 262 on top of the side walls 255 of the guide frame 252.

As best shown in Figs. 7 and 10, the slide 254 is at one end thereof provided with an integral die stock 264 having a liner 266 which is provided with a part-spherical socket 268 for a correspondingly shaped end portion 270 of a die holder 272, having an annular recess 274 for the fitted reception of a die 276. Threadedly received in the die holder 272 is a funnel-shaped stock guide 278 which forces a guide bushing 280 against the die 276 to retain the latter in its seat 274 in the die holder 272. The die holder 272 is held firmly seated in the socket 268 in the die stock by a plurality of bolts 282 and nuts 284 thereon, so that the die holder 272 and the parts carried therein, including the die 276, may as a self-contained unit be mounted in or removed from the die stock 264. Further, the removability of the die holder 272 and the parts therein from the die stock is advantageous for the facile substitution in the die holder of dies of different size apertures for drawing rod stock of different sizes. The tapered opening 285 in the funnel-shaped stock guide 278 leads to the opening in the guide bushing 280 which is sufficiently large to admit with clearance non-drawn rod stock of maximum size, while the aperture 286 of the die 276 is of the desired rod size.

The slide 254 is of considerable length and carries at its leading end remote from the die stock 264 a bracket 288 in which is mounted an end of a tubular stock guide 290 which extends rearwardly into fairly close proximity to the stock guide 278 and is of considerable length so as to hold the rod stock in closely approximate straight disposition over a considerable length immediately preceding its entry into the stock guides 278 and 280 and into the die 276. To facilitate the introduction of the leading end of a supply of continuous rod into the tubular guide 290, the forward end of the latter carries a head 292 having a flared passage 294 that leads to the stock passage in the guide 290.

As previously mentioned, a supply of continuous rod stock to-be-drawn requires for its introduction into the present apparatus no preliminary operation other than the pre-pointing of a relatively short leading length of the stock. Thus, a leading end length of a supply of continuous rod stock may be pre-pointed, to an extent like or similar to that shown at 296 in Fig. 7, by any of the conventional methods followed for this purpose, such as forging, for instance. It has also been previously mentioned that the instant drawing unit is adapted not only for the normal draw of a supply of continuous rod stock through the die 276 by the tractor feed 34, but also for pre-drawing a leading portion of the supply stock which is of sufficient length to be gripped firmly and fed uniformly by the tractor feed for a normal drawing performance of the apparatus when the pre-drawn stock length is brought into cooperative relation with the tractor feed. In order to accomplish the objective of pre-drawing a considerable leading length of a supply of continuous rod stock without requiring the pre-pointing of an unduly long end thereof, the slide 254 with its die 276 is for a pre-drawing operation initially located in the normal drawing position shown in Fig. 7, in which the same is adjacent a preliminary gripping device 298 to be described, which is adapted to hold the pre-pointed end 296 of the rod stock after the same has been extended through the die 276 in the normal drawing position of the slide 254. While thus holding the pre-pointed end 296 of the rod stock in the preliminary gripping device 298, the slide 254 is, in a manner described hereinafter, moved from its normal position (Fig. 7) into the position shown in Fig. 10. In the course of such movement of the slide 254, the die 276 will pre-draw a considerable length s' of the rod stock s (Fig. 10) which assuredly will firmly be gripped and drawn without slippage by the tractor feed 34 when fed into cooperative relation with the latter. For feeding the pre-drawn length s' of the rod stock s into cooperative relation with the tractor feed 34, the slide 254 is, after its concluded stock pre-drawing stroke into the position in Fig. 10, moved in the opposite direction and returned to its normal drawing position (Fig. 7). The static friction between the die 276 and the pre-drawn rod stock s' is sufficient to compel the stock to move with the die on the return stroke of the slide 254 into its normal drawing position in which the same is in abutting engagement with the auxiliary gripping device 298 and is stopped thereby against further movement toward the tractor feed when the latter assumes the draw of the remaining rod stock s through the die 276.

In order to move the slide 254 into either one of its positions (Figs. 7 and 10), there is provided a chain drive 300, comprising spaced sprockets 302 and 304 and a chain 306 thereon having links 308. One of the links 308, namely the link 308', carries a coupling member 310 (Figs. 7 and 8) which is fittedly received in a recess 312 in the bottom 314 of the slide 254, thus drivingly connecting the latter with the chain 306. The operative range of the slide 254 is somewhat shorter than the straight top run 316 of the chain 306 which passes through the guide frame 252, and the link 308', which carries the coupling element 310, is in any position of the slide 254 among the links which make up the chain run 316, so that the coupling element 310 will at all times remain in driving relation with the slide 254 as long as the chain run 316 has no excessive slack.

In order to afford a substantially continuous guide for the rod stock s between the pre-straightening unit 36 and the tubular stock guide 290 on the slide 254, alternate links 308 of the chain 306 in front of the stock guide 290 carry additional guide members 320 which are sufficient in number to form together a substantially continuous stock guide from adjacent the sprocket 302 to the stock guide 290 on the slide 254 in any position of the latter, including its normal drawing position (Fig. 7). Each of the stock guides 320 is suitably mounted with its base 322 on lateral flanges 324 of a pair of associated chain links 308 (Fig. 9), and has a projecting web 326 from which emerges a channel-shaped stock guide 328. Each of these channel guides 328 is not appreciably wider than the maximum size rod stock which may be drawn in the instant apparatus, so that the pre-straightened rod stock will be compelled by the channel guides 328 into substantially straight extension between the pre-straightening unit 36 and the tubular stock guide 290 on the slide 254.

In order to keep the channel guides 328 in accurate alignment with each other over the longitudinal extent of the top run 316 of the chain between the sprocket 302 and the tubular stock guide 290 on the slide 254 in any position of the latter, and also to relieve the links of the chain run 316 of excessive stresses due to the extra weight of the channel guides 328 and possible downward pressure of portions of the rod stock on these channel guides, the link-connecting pivots 330 of the chain 306 carry rotary rollers 332 of which those in the top run 316 of the chain ride on the bottom wall 334 of the guide frame 252, and preferably on a wear plate 336 thereon (Figs. 7 and 10). The bottom wall 334 of the guide frame 252 is cut away at 338 for some distance from the opposite ends of the latter to provide clearance for the sprockets 302 and 304.

In order to afford a further substantially continuous guide for the rod stock s between the preliminary gripping device 298 and the die 276 in most any position of the slide 254, except when the latter is in and near its normal drawing position (Fig. 7), alternate links 308 of the chain 306 in back of the slide 254 carry additional guide members 320 which are sufficient in number to accomplish the purpose in mind. Preferably, all guide members 320 on the chain 306 are identical, and both ends of each channel guide 328 are flared outwardly as at 340 to guide the leading end of a new supply of rod stock thereinto, regardless of the disposition of the guide members 320 on the chain.

The chain-carrying sprocket 304 is keyed at 342 to a shaft 344 which is journalled in antifriction bearings 346 and 348 in journal boxes 350 and 352 that are received in machined recesses 354 and 356, respectively, in the opposite side walls of the base frame 250 (Figs. 7 and 8). Covers 358 and 360 on the journal boxes 350 and 352 engage the outer races of the respective antifriction bearings 346 and 348 therein, while spacer sleeves 362 and 364 are interposed between the hub 366 of the sprocket 304 and the inner races of the bearings 346 and 348, thus preventing axial movement of the sprocket-carrying shaft 344 in its fixed bearings 346 and 348.

The other chain-carrying sprocket 302 is keyed at 368 to a shaft 370 (Figs. 7 and 9) which is journalled in antifriction bearings 372 and 374 in journal boxes 376 and 378 that are fittedly received in machined recesses 380 and 382, respectively, in the opposite side walls of the base frame 250. Covers 384 and 386 on the journal boxes 376 and 378 engage the outer races of the respective antifriction bearings 372 and 374 therein, while spacer sleeves 381 and 382 are interposed between the hub 384 of the sprocket 302 and the inner races of the bearings 372 and 374, thus preventing axial movement of the sprocket-carrying shaft 370.

As mentioned hereinbefore, the journal boxes 376 and 378 for the shaft 370 of the sprocket 302 are fittedly received in the machined recesses 381 and 382 in the opposite side walls of the base frame 250, wherefore the sprocket 302 is fixed in position. In order to take up slack of the chain 306 and tension the same as desired, the journal boxes 350 and 352 for the shaft 344 of the sprocket 304 are movable in their respective recesses 354 and 356 toward and away from the opposite sprocket 302 (Fig. 7), and are adjustable therein by bolts 390 which are threadedly received in the opposite side walls of the base frame 250 and bear against the respective journal boxes 350 and 352.

For operating the chain drive 300, the sprocket 302 is power-driven. To this end, the shaft 370, which carries the driven sprocket 302, is coupled at 392 (Fig. 2) to the output shaft 394 of a reduction gearing 396, the input shaft 398 of which is connected, preferably by a slip coupling 400, with a reversible variable-speed motor 402.

As previously stated, the drawing unit 32 includes also the auxiliary gripping device 298 which, as shown in Figs. 1, 2 and 7, is arranged at the end of the base frame 250 between the slide 254 and the tractor feed 34. The gripping device 298 comprises opposite stock-gripping jaws 404 and 406 (Figs. 7, 11 and 13) which are received in a guideway 408 in a frame 410 for movement into and from gripping engagement with the pre-pointed end 296 of rod stock s after the same has been extended through the die 276 in the normal drawing position of the slide 254. The frame 410 is conveniently bolted at 412 to the base frame 250 (Fig. 11), and is additionally keyed thereto as at 414 for reenforcing the mount of the gripper frame 410 on the base frame 250 in order to withstand with safety the very considerable stresses imposed on the gripper frame by the die 276 either during a stock pre-drawing performance or during a normal stock-drawing performance of the latter. The jaws 404 and 406, the stock-gripping surfaces of which are preferably serrated as at 416 for a secure grip on the rod stock, are retained in the guideway 408 in the gripper frame 410 by a suitably mounted cover plate 418 thereon. Projecting into the guideway 408 on opposite sides of the jaws 404 and 406 are eccentric portions 420 and 422 of shafts 424 and 426, respectively, each of which is journalled in suitable bearing sleeves 428 and 430 in the gripper frame 410. The eccentric portions 420 and 422 of the shafts 424 and 426 are operatively connected with the jaws 404 and 406, respectively, by toggle links 432 and 434. The shafts 424 and 426 have gears 436 and 438, respectively, which are in permanent mesh with a rack 440 (Figs. 12 and 15) that is cylindrical and guided for axial movement transversely of the gripped rod stock s in spaced bushings 442 in the gripper frame 410. One end of the rack 440 is connected at 444 with the rod 446 of a piston in a cylinder 448 on the gripper frame 410. The piston in the cylinder 448 is in this instance operated by compressed air, and is of the double-acting type, the cylinder having ducts (not shown) leading to the opposite ends of the chamber therein and being connected through conduits 450 and 452 with a suitable valve (not shown) with which to control the performance of the cylinder 448.

The gripper frame 410 is at its bottom provided with a recess 454 to provide clearance for a pan 456 into which drop through another passage 458 in the gripper frame all chips removed from the gripped pointed end 296 of rod stock s by the serrated gripping surfaces 416 of the jaws 404 and 406.

Tractor feed 34

Referring now more particularly to Figs. 16 to 21, inclusive, the tractor feed 34 comprises two chains 460 and 462 which pass over spaced pairs of sprockets 464—466 and 468—470, respectively. The sprocket pairs 464—466 and 468—470 are so arranged that two adjacent straight feed runs 472 and 474 of the chains 460 and 462 are substantially parallel and closely adjacent each other. The chains 460 and 462 are of the double-roller type (Figs. 18 to 20) and carry between their inner links 476 feed blocks 478 which are grooved on the outside as at 480 to grip the drawn rod stock between the feed runs 472 and 474 and guide the same through the latter. The sprockets 464 to 470 for the chains 460 and 462 are journalled, in a manner to be described, in an upright feed frame 482, so that these sprockets and the chains thereon are located and accessible in front of the feed frame. The feed frame 482 is arranged end-to-end with the base frame 250 of the drawing unit 32 (Figs. 1 and 2), so that the sprockets 464 and 468 of the tractor feed are nearest the drawing unit 32. Accordingly, the rod stock proceeds through the tractor feed in the direction of the arrows 484 in Fig. 16, and the sprockets 466 and 470 at the exit end of the tractor feed are power-driven so that the feed runs 472 and 474 of the chains have traction on the drawn rod stock for the uniform draw of the remainder of the rod stock through the die 276 in the normal drawing performance of the apparatus.

As shown in Fig. 20, the sprockets 464 and 468 at the stock-entry end of the tractor feed are journalled on antifriction bearings 486 and 488 on stub extensions 490 and 492 of shafts 494 and 496, respecticvely, which are turnably mounted in bushed apertures 498 and 500, respectively, in the feed frame 482. The driven sprockets 466 and 470 at the exit end of the tractor feed are keyed at 502 and 504 to stub extensions 506 and 508 of shafts 510 and 512, respectively (Fig. 18). Of these, shaft 510 is journalled in spaced antifriction bearings 514 and 516 in a journal box 518 which is turnably mounted in a cylindrical aperture 520 in the feed frame 482. The sprocket shaft 512 is journalled in spaced antifriction bearings 520 and 522 in a journal box 524 which is turnably mounted in a cylindrical aperture 525 in the feed frame 482. The ends of the sprocket shafts 510 and 512 extend in back of the feed frame 482 and have keyed thereto at 526, and 528 sections 530 and 532 of two flexible couplings 534, respectively, the other sections 536 of which are connected by shafts 538 with sections 540 of two other flexible couplings 542 (Fig. 2). The other sections 544 of the flexible couplings 542 are carried by two output shafts 546 of a reduction gearing 548 which are driven at the same speed, but in opposite directions, for the correct drive of the sprockets 466 and 470 for stock-drawing purposes. The input shaft 550 of the reduction gearing 548 is coupled at 552 to a variable speed motor 554.

The feed runs 472 and 474 of the tractor chains 460 and 462 ride on tracks 556 and 558, respectively, which hold these feed runs in position to grip the rod stock uniformly throughout and with sufficient overall pressure to prevent slippage of the stock (Figs. 16 and 21). The tracks 556 and 558 are in this instance roller tracks so as to keep the friction between them and the chain runs 472 and 474 thereon at a minimum.

The track 558 for the feed run 474 of the lower chain 462 comprises a support 560 for a series of rollers 562. For convenience of manufacture and assembly, the support 560 is in this instance divided into complementary sections 564 and 566 (Fig. 21) which have oppositely inclined bottom surfaces 568 and 570, respectively, with which to rest on wedge-blocks 572 and 574, respectively. The complementary support sections 564 and 566 are in end-to-end engagement with each other and are guided for movement toward and away from the adjacent chain run 474 between machined surfaces 576 and 578 of laterally projecting lugs 580 and 582, respectively, on the feed frame 482. The support sections 564 and 566 are provided in their top surfaces with grooves 590, respectively, which combine to form a continuous groove throughout the longitudinal extent of the support 560. Carried by each support section 564 and 566 are a plurality of equally spaced pins 592 which extend across the top groove 590 therein and rotatably support the rollers 562, respectively, so that the peripheries of the latter project above the tops of the support sections and are solely engaged by the inner links 476 of the feed run 474 of the chain 462 (see also Fig. 19).

The wedge-blocks 572 and 574, which are slidably supported on wear plates 594 on a lateral ledge 596 on the feed frame 482, are held against a machined surface 598 on the feed frame (Fig. 19) by a retainer plate 600 which is bolted at 602 to the ledge 596 and lugs 580 and 582 on the feed frame (see also Fig. 16). The wedge-blocks 572 and 574 have their adjacent ends partly cut away so that they may overlap each other in the fashion indicated in Fig. 21 and permit movement of the wedge blocks toward and away from each other for upward or downward adjustment of the roller track 558.

In order to move the wedge-blocks 572 and 574 for the purpose of adjusting the roller track 558, the former are provided with vertical grooves 604 and 606, respectively, in which are slidably received blocks 608 and 610 on crank pins 612 and 614 on the ends of shafts 616 and 618 (Figs. 19, 21 and 17). Shaft 618 is journalled in a bushed bearing aperture 620 in the feed frame 482, and the other shaft 616 is similarly journalled in the feed frame. The ends of the shafts 616 and 618 which extend in back of the feed frame 482 carry identical worm gears 622 and 624, respectively, which are in permanent mesh with worms 626 and 628 on shafts 630 and 632, respectively (Fig. 17). The worm shafts 630 and 632, which are journalled in suitable bearing brackets 634 and 636 on the feed frame 482, are coupled to each other as at 638, and the worm shaft 632 is further coupled at 640 to another shaft 642 which is journalled in a suitable bearing bracket 644 on the feed frame. Carried by one end of the shaft 642 is a bevel gear 646 which is in permanent mesh with another bevel gear 648 on the lower end of a vertical shaft 650 which is journalled in spaced bearing brackets 652 and 654 on the feed frame 482 in back thereof. The upper end of the vertical shaft 650 carries a bevel gear 656 which is in permanent mesh with another bevel gear 658 on the rear end of a horizontal shaft 660 which extends to the front of the feed frame 482 and is journalled in a suitable bearing bracket 662 on top of the feed frame. The other end of the horizontal shaft 660 carries a handwheel 664 which is readily accessible from the front of the tractor feed (Figs. 1, 2 and 16). The crank pins 612 and 614 are so coordinated that manipulation of the handwheel 664 in either direction will, through intermediation of the bevel gears 658, 656, 648, 646 and the worm gearings 628, 624 and 626, 622, result in equal movement of the wedge-blocks 572 and 574 toward or away from each other and, accordingly, in upward or downward movement of the roller track 558 for the feed run 474 of the lower chain 462.

The track 556 for the feed run 472 of the upper chain 460 is made up of complementary track sections 670 (Figs. 16, 19 and 21) which are arranged side-by-side to form a continuous support for a multiplicity of rollers 672 which are rotatably mounted, in this instance in series of 3 rollers, in grooves 674 in the individual track sections 670 in the manner best shown in Fig. 19. The side-by-side arranged track sections 670 are guided for upward and downward movement toward and away from the feed run 472 of the upper chain 460 between machined surfaces 676 and 678 of projecting lugs 680 and 682, respectively, on the feed frame 482 (Fig. 21). The track sections 670 are suspended on rods 684 of pistons 686 in cylinders 688 which are arranged battery-like between the opposite runs 472 and 472' of the upper chain, and bolted at 690 to the feed frame 482 from the back thereof (Figs. 17 and 21). More particularly, the track sections 670 are suspended on enlarged heads 692 on the piston rods 684 which are received in T-type slots 694 in the track sections, so that the latter may readily be assembled with or dismounted from the piston rods 684. The track sections 670 are held against a machined surface 696 on the feed frame 482 by a retainer plate 698 (Figs. 16 and 19) which is bolted at 700 to the lugs 680 and 682 on the feed frame. Further bolts 702 and spacer sleeves 704 serve to hold the retainer plate 698 in properly spaced relation with the machined surface 696 of the feed frame between the lugs 680 and 682 thereon.

The pistons 686 in the cylinders 688 are in this instance operated by compressed air, and are double-acting as evidenced by the provision of air ducts 706 and 708 in the cylinders 688 which lead to the opposite ends of the chambers therein (Fig. 21). For simultaneously distributing compressed air to either ends of the chambers in the cylinders 688 and venting the other ends of the latter, there is provided a single manifold 710 (Fig. 21) having two longitudinal grooves 712 and 714 as well as branch grooves 716 and 718 therefrom, respectively, which lead to transverse passages 720 and 722 that are in communication with the ducts 706 and 708, respectively, in the various cylinders (Fig. 19). The manifold 710 is interposed between the cylinders 688 and a machined surface 723 on the feed frame 482 (Fig. 19), and is held in place by the same bolts 690 which are used for mounting the cylinders 688. Preferably, interposed between the surface 723 of the feed frame 482 and the manifold 710 is a gasket 724 (Fig. 19) which effectively seals the grooves 712, 714, 716 and 718 against leakage of air therefrom. The main distributing grooves or channels 712 and 714 of the manifold 710 communicate with passages 726 and 728, respectively, in the feed frame 482 (Fig. 19), and these passages 726 and 728 are, in turn, connected through conduits 730 and 732 with a suitable valve 734 (Fig. 17) for controlling the admission of compressed air into either one of the main distributing channels 712 or 714 and permitting simultaneous exhaust of compressed air from the cylinders through the other main distributing channel in the manifold 710.

As shown in Fig. 19, the axes of the piston rods 684 intersect the stock-gripping grooves 480 in the feed blocks 478 in the chains 460 and 462, so that the full force of the pistons 686 is directly transmitted to the fed rod stock and the track sections 670 are not subjected to harmful bending stresses.

The sprocket-carrying stub extensions 490 and 492 on the shafts 494 and 496, respectively, are disposed eccentrically thereon (Fig. 20), and these shafts are normally yieldingly urged in directions to move the respective sprockets 464 and 468 at the entry end of the tractor feed away from the driven sprockets 466 and 470 (Fig. 16) in order to take up all slack in the chains 460 and 462 and tension the same as desired. To this end, the shafts 494 and 496 carry in back of the feed frame 482 levers 740 and 742, respectively, which are connected at 744 and 746 with the rods 748 and 750 of pistons in cylinders 752 and 754, respectively (Figs. 17 and 20). The cylinders 752 and 754 are pivotally mounted at 756 and 758, respectively, on a bracket 760 in back of the feed frame 482. The pistons in the cylinders 752 and 754 are in this instance operated by compressed air, and are of the double-acting type as evidenced by the provision of conduits 762, 764 and 766, 768 (Fig. 17) that communicate with the opposite ends of the chambers in the cylinders 752 and 754, respectively. The conduits 762 to 768 may also be connected with a suitable valve (not shown) to admit compressed air to either one of the adjacent ends of the cylinders 752 and 754, and simultaneously vent the other adjacent ends of these cylinders.

As previously mentioned, the return stroke of the die-carrying slide 254 into its normal drawing position (Fig. 7) is utilized to feed the pre-drawn leading length *s'* of a supply of rod stock *s* into the tractor feed. In order that the running tractor feed may not offer to the leading end of the pre-drawn stock length thus fed toward the tractor feed such a resistance as would overcome the static friction between the die 276 and the pre-drawn stock and accordingly interrupt the feed of the latter into the tractor feed, provisions are made to provide between the feed runs 472 and 474 of the chains 460 and 462 a minimum gap which will be retained even if no stock is between these feed runs and which, while narrow, is nevertheless sufficient to admit the pre-drawn stock into firm gripping engagement with the feed runs 472 and 474 without interrupting the feed of the former into the tractor feed. To this end, there is provided on top of each of the cylinders 688 a block 770 through which extends a rod extension 772 of the piston in the cylinder (Figs. 19 and 21). These rod extensions 772 have end collars 774 which rest against a spacer plate 776 on the blocks 770 on top of the cylinders 688 when compressed air in the upper ends of the latter force the upper track 556 downwardly and no pre-drawn stock is between the feed runs 472 and 474 of the chains 460 and 462. When the end collars 774 on the rod extensions 772 thus rest on the spacer plate 776, the pistons 686 in the cylinders 688 are held some distance from their lowest possible stroke positions therein, and the aforementioned minimum gap between the feed runs 472 and 474 of the chains 460 and 462 is retained when no stock is between these feed runs. The pistons 686 in the cylinders 688 are in Figs. 19 and 21 shown in retracted position in which the upper track 556 is withdrawn from the adjacent feed run 472 of the upper chain 460 in order to relieve the same of the tension imparted thereto by this track when the apparatus is idle or the chain 460 is to be relaxed for any other purpose to the extent afforded by the retraction of the track 556. The spacer plate 776 is removably seated in aligned machined grooves 778 in the blocks 770 on the cylinders 688 (Fig. 19), and has notches 780 to clear the rod extensions 772. On account of the considerable length of the tractor feed, the spacer plate 776 is preferably formed in complementary sections 776' (Fig. 23) each of which has handles 782 for its convenient mounting and removal.

The feed runs 472 and 474 of the chains 460 and 462 are, by virtue of the described yieldability and adjustability of the tracks 556 and 558, respectively, adapted for feeding rod stock of different drawn sizes. Accordingly, the shafts 494 and 496, which carry the sprockets 464 and 468 at the entry end of the tractor feed, are so spaced from each other that the gap between the adjacent ends of the feed runs 472 and 474 of the chains on these sprockets 464 and 468 is not less than the maximum drawn rod size to be fed by the tractor feed. On the other hand, provisions are made for adjusting the power-driven sprockets 466 and 470 at the exit end of the tractor feed toward and away from each other so that they may, on any adjustment of the track 558 for any given drawn rod size, draw the feed runs 472 and 474 of the chains in rectilinear paths over and beyond their respective tracks 556 and 558, with the result that the pull of these sprockets 466 and 470 on the respective feed runs 472 and 474 of the chains will not compel the same into pressing engagement with their tracks and will not cause them to bend abruptly at the run-off ends of the tracks. This is accomplished by mounting the bearings 514 and 516 for the sprocket shaft 510 eccentrically in the journal box 518 (Figs. 18 and 22) and providing on the journal box 518 in back of the feed frame 482 a worm gear 782 (Figs. 17 and 18) which is in mesh with a worm 784 on the previously described shaft 642. The bearings 520 and 522 for the sprocket shaft 512 (Fig. 18) are similarly eccentrically mounted in the journal box 524, and carried by the latter in back of the feed frame 482 is another worm gear 786 which is also in mesh with the worm 784 (Figs. 17 and 18). Thus, the driven sprockets 466 and 470 are adjusted toward and away from each other simultaneously with a like adjustment of the track 558 for the feed run 474 of the lower chain 462, all on manipulation of the handwheel 664, as will be readily understood.

In order to facilitate an operator's task of adjusting the tractor feed to a given size rod stock and to expedite the accurate adjustment of the tractor feed, there is provided in front of the feed frame 482 within ready view of an operator at the handwheel 664 a dial 790 (Fig. 16) with which cooperates a turnable hand or pointer 792 that indicates on the graduations 794 on the dial the adjustment of the tractor feed at any instant. The dial 790 is preferably graduated in different rod stock sizes, and the pointer 792 is carried by a shaft 796 (Fig. 18) which is journalled in a suitable bearing bracket 798 on top of the feed frame 482, and carries in back of the latter a sprocket 800 which is drivingly connected by a chain 802 with a sprocket 804 on the journal box 518 (see also Fig. 17). Thus, if an operator is called upon to adjust the tractor feed for any given size rod stock, he manipulates the handwheel 664 and simply watches the hand 792 travel on the dial 790. When the hand 792 points to that graduation on the dial 790 which corresponds to the size of the rod stock to which the tractor feed is to be adjusted, the operator stops further manipulation of the handwheel 664 since the tractor feed is then accurately adjusted to the desired rod size. The adjustment of the tractor feed to odd sizes of rod stock not noted on the dial 790 is as facile as its adjustment to the standard rod sizes noted on the dial, the standard rod size graduations 794 on the dial then serving as approximate guides for the quick and accurate adjustment of the tractor feed.

Adjustably mounted at 810 in front of the feed frame 482 is a channel-shaped support 812 (Figs. 16, 19 and 21) on which the lower run 474' of the lower chain 462 may rest when the latter is slackened for replacement, repair or other purposes. A similar support 814 is mounted in front of the feed frame 482 for the upper run 472' of the upper chain 460. Mounted at 816 on the front of the feed frame 482 at the entry end thereof is a bracket 818 which carries a rod stock guide 820 that substantially spans the distance between the preliminary gripping device 298 and the entry end of the feed runs 472 and 474 of the chains 460 and 462 (Fig. 1). A similar rod stock guide 822 is carried by a bracket 824 on the feed frame 482 at the exit end of the tractor feed (Fig. 16). The sprockets 464 to 470 are preferably normally covered by removable protective guards 826 (Fig. 1).

*Mode of operation*

Let it be assumed that the pre-straightener unit 36 and the tractor feed 34 have been adjusted for a drawing operation of the apparatus on a supply stock of a given rod size, and a die 276 of the proper aperture has been mounted in the holder 272 of the drawing unit 32. The beforementioned valves for the cylinders 202 and 146, 148 are then operated to open the feed rolls 42 and 44 and also the straightener rolls 38 and 40 (Figs. 5 and 6). A pre-pointed end 296 of the rod stock is then passed over a guide roll 830, through a stock guide 832, and into the open feed rolls 42, 44 and straightener rolls 38, 40 of the pre-straightener unit 36. The die-carrying slide 254 is then in its normal drawing position (Fig. 7) which it assumed during the preceding normal drawing performance of the apparatus. The valves for the cylinders 202 and 146, 148 are now again operated to cause closure of the feed rolls 42 and 44 and also of the straightener rolls 38 and 40 (Figs. 5 and 6). The motor 246 is now started for the feed of the rod stock by the rolls 42 and 44 through the straightener rolls 38 and 40 and through the channel guides 328 into and through the die 276 in the normal drawing position of the slide 254. The motor 246 is stopped when the non-pointed end of the rod stock is thus fed into engagement with, or into close proximity to, the die 276 and the prepointed end 296 of the rod stock extends between the then retracted jaws 404 and 406 of the preliminary gripping device 298 in a manner like or similar to that shown in Fig. 7. Next, the hereinbefore mentioned valve for the cylinder 448 (Figs. 11 to 13) is operated to cause the jaws 404 and 406 of the gripping device 298 to grip and hold the pre-pointed stock end 296 therebetween, and the valves for the cylinders 202 and 146, 148 (Figs. 5 and 6) are also operated to cause opening of the feed rolls 42, 44 and also of the straightener rolls 38, 40. The motor 402 is next started in reverse direction (Fig. 2) to cause retraction of the die-carrying slide 254 from its normal drawing position (Fig. 7) into the retracted position in Fig. 10, in the course of which the die 276 pre-draws the stock length $s'$ to the desired drawn rod size. The drive of the motor 402 is reversed after the die-carrying slide 482 reaches its retracted position (Fig. 10), so that the slide 482 will now be advanced into its normal drawing position (Fig. 7) for the feed of the pre-drawn stock length $s'$ toward and into gripping and feeding relation with the tractor feed 34. Prior to or simultaneously with the reversal of the motor 402 after the slide 452 reaches its retracted position, the valve for the cylinder 448 (Fig. 11) is operated to cause opening of the jaws 404 and 406 of the gripping device 298 and, accordingly, release of the pre-drawn rod stock length $s'$ for its subsequent feed by the die 276 toward and into gripping and feeding relation with the running tractor feed 34. When the jaws 404 and 406 of the gripping device 298 are operated to release the pre-pointed stock end 296, the valve for the cylinders 146 and 148 may also be operated to close the straightener rolls 38 and 40 so that they will subsequently perform their designated function on the rod stock. The die-carrying slide 254 may be moved through its stock pre-drawing stroke by the motor 402 at moderate speed, such as 50 feet per minute, for example, and the reverse drive of the motor 402 for the stock pre-drawing stroke of the die-carrying slide 254 may advantageously be stopped automatically when a finger 840 on an upright bracket 842 on the slide 254 operates a switch 844 on the guide frame 252 of the drawing unit 32 (Figs. 2 and 8). The variable speed motor 554 for the tractor feed has been started prior to the return of the die-carrying slide 254 into its normal drawing position, and the tractor chains 460 and 462 will then be driven at an initial or base stock-feeding speed which is slower than their normal feeding speed during a normal stock-drawing performance of the apparatus. Thus, the initial stock-feeding speed of the tractor chains 460 and 462 may be in the neighborhood of 80 feet per minute, for example. The die-carrying slide 254 is during the greater part of its return stroke into its normal drawing position (Fig. 7) moved preferably at a speed which is the same as or slightly less than the aforementioned initial or base stock-feeding speed of the tractor chains 460 and 462, so that the latter will smoothly assume the feed of the pre-drawn stock length $s'$ without jerking the same. When the die-carrying slide 254 reaches, toward the end of its return stroke into its normal drawing position, the position in which the finger 840 (Fig. 8) operates a switch 850 on the guide frame 252 of the drawing unit 32 (Fig. 2), the switch 850 will cause the motor 402 to slow down the slide 254 for the brief remainder of its return stroke into normal drawing position. The tractor feed, even though operating at the beforementioned low initial stock-feeding speed will now start, at a slow rate, to draw non-drawn rod stock through the die 276 while the slide 254 passes through the short remainder of its return stroke into normal drawing position, as will be readily understood. The die-carrying slide 254 will come to rest in its normal drawing position (Fig. 7) when the finger 840 actuates a limit switch 852 on the guide frame 252 of the drawing unit 32 (Fig. 2), said limit switch stopping the motor 402 in time to prevent any forceful impact of the slide 254 with the gripping device 298. The drive of the tractor feed may thereupon be stepped up to its full operating speed for the uniform draw of the rest of the rod stock through the die 276 while the slide 254 remains in its normal drawing position (Fig. 7). A full operating cycle of the present apparatus is concluded when the trailing end of the rod stock has been drawn through the die 276 by the tractor feed 34.

Suitable automatic or semi-automatic controls may be provided for the timed performance of the various operating devices of the instant apparatus. Controls of this type, which may be selected to suit any desired operating conditions of the apparatus, do not form any part of the present invention and, hence, are not disclosed herein. Also, while not forming any part of the present invention and, hence, being not disclosed, these controls may include provisions for jogging the feed rolls 42 and 44 of the pre-straightening unit 36, the die-carrying slide 254 of the drawing unit 32, and also the chains 460 and 462 of the tractor feed 34, or for emergency-stopping the entire apparatus at any time.

The instant apparatus is also well adapted for drawing rod stock of different sizes. Thus, a changeover of the apparatus for drawing rod stock of any size between limits imposed by the construction of the various units thereof, requires merely the simple substitution of dies in the holder 272 of the drawing unit 32, simultaneously adjustment of the lower chain track 558 and of the driven sprockets 466 and 470 by the single handwheel 664, ready substitution of the spacer plates 776 in the tractor feed 34, and ready adjustment of the straightener rolls 40 of the pre-straightener unit 36 by means of the handwheels 100, 108 and 110.

The instant stock-drawing apparatus, by relying on a tractor feed for the draft of the rod stock through the die of the apparatus, will perform reliably and efficiently at a normal operating speed which may be several times greater than the maximum permissible speed of previous stock-drawing apparatus with their alternately performing stock-hauling grippers. It may here be mentioned, by way of example only and not in any limiting sense whatsoever, that normal stock-drawing speeds of 350 feet per minute have been obtained with the instant apparatus, whereas the maximum permissible stock-drawing speeds of previous apparatus of this type are in the neighborhood of 80 to 150 feet per minute. Further, due to the considerable length of the tractor feed 34 and its extensive contact area with the fed stock therein, the same exerts such a low specific gravity on the stock that the latter will assuredly not be marred even at exceptionally high operating speed of the tractor feed. By having the instant drawing unit 32 perform its dual function of pre-drawing a leading length of a new supply of continuous rod stock and also lending itself to the normal draw of the rest of the rod stock through the same die by the tractor feed, no preliminary operations on the supply stock, other than the pre-pointing of a short end of the same, are required for the facile introduction of the rod stock supply in the apparatus for a drawing operation. By using one and the same die for pre-drawing a leading length of a new supply of continuous rod stock, as well as for drawing the entire rest of the stock, the entire rod stock, including its pre-drawn length, will be reduced to the same exact size even if the die should be slightly worn, and the entire stock will be gripped most uniformly by the tractor feed for its uniform draw through the die. Underlying the principle of the operation of the instant apparatus is an important method of pre-drawing a leading length of a new supply of continuous rod stock in the die of the apparatus, according to which a relatively short pre-pointed end of the stock is passed through the die and temporarily gripped and held immediately behind the die in its normal operating or drawing position, and the die is then retracted over the stock thus held through a distance commensurate with the leading stock length to be pre-drawn for its subsequent secure grip and feed by the tractor feed. While the instant apparatus is preferred for pre-drawing a leading stock length in accordance with this method, rod stock could be pre-drawn according to this method in apparatus other than that disclosed. For example, it is conceivable that rod stock could be pre-drawn in accordance with the present method by eliminating the preliminary gripping device 298 and instead having the tractor feed perform the additional function of the preliminary gripping device, by arranging the non-driven sprockets 464 and 468 of the tractor feed so that they are movable to and from each other and cause the chain sections thereon to grip the pre-pointed end of the rod stock for a pre-drawing operation according to this method. Another important feature of the aforementioned method of pre-drawing a leading length of a new supply of continuous rod stock lies in relying solely on the very considerable static friction between the die and the pre-drawn rod stock in feeding the latter into the tractor feed for the following normal stock-drawing performance of the apparatus, by simply returning the die from its retracted position to its normal drawing position, thus entailing a minimum of handling of the rather unwieldy rod stock in the task of introducing a new supply of rod stock in the apparatus for a drawing operation. Another important feature of the present apparatus lies in the provision of the chain 306 for moving the die-carrying slide 254, and the provision on the links of this chain of the complementary guide members 320 which, during movement of the slide in either direction and when the latter is in its normal drawing position, combine to form over the entire path of the slide a substantially continuous stock guide which effectively counteracts any tendencies of the rod stock to bend or buckle, thus preventing undue wear or even damage to the die, or jamming of rod stock therein. Another important feature of the present apparatus lies in the fact that the preliminary gripping device 298 and the tractor feed 34 are, by virtue of the yieldability of the gripping jaws 404 and 406 and of the chain track 556, self-compensating so that rod stock will securely be gripped thereby for pre-drawing and normal drawing purposes even if the aperture of the die 276 should through wear have become enlarged. Of further considerable importance is the ready interchangeability of dies of different size apertures in the die holder of the drawing unit, and the ready adjustability of the tractor feed so that rod stock drawn to different sizes in different dies will be gripped evenly by the tractor feed and subjected thereby to equal tensile stresses throughout and no other stresses, with the result that drawn rod stock of any size will emerge straight, or substantially straight, from the tractor feed. In this connection, the provision of an adjustable track and a yielding companion track for the respective feed runs of the chains of the tractor feed is a distinct feature, in that these feed runs may be brought into exact axial alignment with the aperture of the die in which the stock is drawn. Of considerable advantage is the power-drive of those sprockets of the tractor chains which are at the exit end of the tractor feed, so that the operating runs of these chains will have maximum traction on the rod stock in the die of the apparatus. Of further advantage is the adjustability of the power-driven sprockets of the chains of the tractor feed, in that they may, on any adjustment of the non-yielding chain track for any given drawn rod size, draw the feed runs of the tractor chains in rectilinear paths over and beyond their respective tracks, with the result that the pull of these sprockets on the feed runs of the chains will not compel the latter into pressing engagement with their tracks and will not cause them to bend abruptly at the run-off ends of these tracks. Of considerable advantage also is the formation of the yielding chain track of the tractor feed by a battery of side-by-side arranged track sections each of which is individually yieldable, so that rod stock will be gripped most evenly by the opposite chain tracks throughout their lengths. In this connection, it is a distinct feature to provide for each of the aforementioned track sections a cylinder and a piston therein for urging the track section against the adjacent feed run of the associated chain of the tractor feed, and to arrange these cylinders between the opposite runs of the associated chain, and so that the axes of the pistons therein intersect the rod stock passing through the tractor feed, with the result that the full force of the pistons is directly applied to the fed rod stock without setting up harmful bending stresses either in the pistons or in the track sections. Another distinct feature lies in the provision of the interchangeable spacer plates on top of the cylinders for the yielding chain track of the tractor feed, so that the pistons in these cylinders will be stopped short of their full stock-gripping strokes and the feed runs of the tractor chains will remain sufficiently separated to grip and draw rod stock of any size which is being introduced by the die of the drawing unit into the running tractor feed. The task of adjusting the non-yielding chain track and the driven sprockets of the chains of the tractor feed to rod stock of different sizes is greatly facilitated in that these adjustments may be undertaken simultaneously on manipulation of a single handwheel. The accurate adjustment of the tractor feed to different rod sizes may also be considerably expedited by providing the tractor feed with the beforementioned dial which is graduated in different rod sizes, and the moving hand which indicates on the dial the particular adjustment of the tractor feed at any instant. The uniform and high-speed stock-drawing performance of the instant apparatus also renders the latter particularly adaptable for direct cooperation with modern high-speed stock-cutting apparatus of the flying type in which the drawn stock may be cut to desired lengths as it is being fed forwardly at considerable speed by the tractor feed of the instant apparatus.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A pre-draw unit for rod stock, comprising a die having an aperture of the desired drawn rod size and being guided for movement axially of its aperture; means for releasably gripping the end of a pre-pointed end length of the rod stock extended through said die aperture; means for moving said die into advance and retract positions, including spaced rotary sprockets and a chain thereon having a straight run substantially parallel to the direction of movement of said die and being drivingly connected with the latter, said die being in its advance position in close proximity to said gripping means and pre-drawing another length of the gripped rod stock on movement into said retract position; and spaced guide elements carried by said chain and cooperating to form a guide channel for rod stock to said die aperture between the end of said chain run most remote from said gripping means and said die in any position of the latter.

2. A pre-draw unit for rod stock as set forth in claim 1, in which each of said guide elements is channel-shaped.

3. A pre-draw unit for rod stock as set forth in claim 1, in which each of said guide elements is a channel having its end which faces away from said die flared outwardly.

4. A pre-draw unit for rod stock, comprising a die having an aperture of the desired drawn rod size; a slide carrying said die at one end thereof and being guided for rectilinear movement axially of said die aperture; a tubular rod guide extending in axial alignment with said die aperture and being carried by said slide at the other end thereof; means for moving said slide into advance and retract positions, including spaced rotary sprockets and a chain thereon having a straight run substantially parallel to the direction of movement of said slide and being drivingly connected with the latter; and releasable gripping means in close proximity to said one end of the slide in its advance position, said gripping means being adapted to grip the end of a pre-pointed end length of rod stock extended through said die aperture in the advance position of said slide, and said die pre-drawing another length of the gripped rod stock on movement of said slide from said advance position into said retract position.

5. A pre-draw unit for rod stock as set forth in claim 4, further comprising spaced guide elements carried by said chain and cooperating to form a guide channel for rod stock to said tubular rod guide between the latter and the end of the chain run most remote from said gripping means in any position of said slide.

6. A pre-draw unit for rod stock, comprising a die holder for interchangeable dies of different size apertures; a slide carrying said die holder at one end thereof and being guided for rectilinear movement axially of the aperture of a die in said holder; a tubular guide for maximum size rod stock to-be-predrawn, said guide extending in axial alignment with the aperture of a die in said holder and being carried by said slide at the other end thereof; means for moving said slide into advance and retract positions, including spaced rotary sprockets and a chain thereon having a straight run substantially parallel to the direction of movement of said slide and being drivingly connected with the latter; and releasable yielding gripping means in close proximity to said one end of the slide in its advance position, said gripping means being adapted to grip the end of a pre-pointed end length of rod stock extended through the aperture of a die in said holder in the advance position of said slide, and a die in said holder being adapted to pre-draw another length of the gripped rod stock on movement of said slide from said advance position into said retract position.

7. A pre-draw unit for rod stock as set forth in claim 6, further comprising spaced guide elements carried by said chain and cooperating to form between said tubular rod guide in any position of said slide and the end of the chain run most remote from said gripping means a guide channel which is wider than the maximum size of rod stock to-be-predrawn.

8. A pre-draw unit for rod stock, comprising a die having an aperture of the desired drawn rod size and being guided for movement axially of its aperture; means for releasably gripping the end of a pre-pointed end length of the rod stock extended through said die aperture; and means for moving said die into advance and retract positions, including spaced rotary sprockets and a chain thereon having a straight run substantially parallel to the direction of movement of said die and being drivingly connected with the latter, said die being in its advance position in close proximity to said gripping means and pre-drawing another length of the gripped rod stock on movement into said retract position.

9. Apparatus for drawing rod stock, comprising a die having an aperture of the desired drawn rod size; means for releasably gripping the end of a pre-pointed leading length of the rod stock extended through said die aperture; power means for moving said die longitudinally of the gripped rod stock into advance and retract positions to pre-draw another length of the gripped rod stock on movement of said die into said retract position; power-operated feeding means in line with said die aperture and adapted to grip rod stock of drawn size and draw non-drawn rod stock through said die, said predrawn stock length being fed into gripping relation with said feeding means by said die on movement of the latter from said retract position into said advance position; and control means operative on movement of said die into said advance position to render said power means inoperative so that said die remains in said advance position for the draw of the remainder of the rod stock therethrough by said feeding means.

10. Apparatus for drawing rod stock, comprising a die having an aperture of the desired drawn rod size; means for releasably gripping the end of a pre-pointed leading length of the rod stock extended through said die aperture; power means for moving said die longitudinally of the gripped rod stock into advance and retract positions to pre-draw another length of the gripped rod stock on movement of said die into said retract position; a power-operated tractor feed having two sets of rotary sprockets carrying endless chains, respectively, so that adjacent runs thereof extend substantially parallel to each other and in line with said die aperture, and are adapted to grip drawn rod stock and draw non-drawn rod stock through said die, said pre-drawn stock length being fed into feeding relation with said adjacent chain runs by said die on movement of the latter from said retract position into said advance position; and control means operative on movement of said die into said advance position to render said power means inoperative so that said die remains in said advance position for the draw of the remainder of the rod stock therethrough by said tractor feed.

References Cited in the file of this patent

UNITED STATES PATENTS

| Number | Name | Date |
| --- | --- | --- |
| 1,321,729 | Friel | Nov. 11, 1919 |
| 1,934,466 | Hogue | Nov. 7, 1933 |
| 2,213,336 | Clouse | Sept. 3, 1940 |
| 2,226,400 | Gaines | Dec. 24, 1940 |
| 2,228,746 | Berkebil | Jan. 14, 1941 |
| 2,288,612 | DeWyk | July 7, 1942 |
| 2,314,605 | Arnold | Mar. 23, 1943 |
| 2,335,939 | Hill | Dec. 7, 1943 |
| 2,341,667 | Stacy | Feb. 15, 1944 |
| 2,344,293 | Evans | Mar. 12, 1944 |